United States Patent
Xu et al.

(10) Patent No.: US 9,362,851 B2
(45) Date of Patent: Jun. 7, 2016

(54) ROTARY MOTOR SYSTEMS AND METHODS THEREOF

(71) Applicant: New Scale Technologies, Inc., Victor, NY (US)

(72) Inventors: Qin Xu, West Henrietta, NY (US); Matthew Wrona, Fairport, NY (US); David A. Henderson, Farmington, NY (US); Daniele Piazza, Rochester, NY (US)

(73) Assignee: New Scale Technologies, Inc., Victor, NY (US)

(*) Notice: Subject to any disclaimer, the term of this patent is extended or adjusted under 35 U.S.C. 154(b) by 305 days.

(21) Appl. No.: 14/010,075

(22) Filed: Aug. 26, 2013

(65) Prior Publication Data
US 2014/0055004 A1    Feb. 27, 2014

Related U.S. Application Data

(60) Provisional application No. 61/693,665, filed on Aug. 27, 2012.

(51) Int. Cl.
| | | |
|---|---|---|
| *H02N 2/10* | (2006.01) | |
| *H02N 2/00* | (2006.01) | |
| *B06B 1/16* | (2006.01) | |

(52) U.S. Cl.
CPC *H02N 2/103* (2013.01); *B06B 1/16* (2013.01); *H02N 2/006* (2013.01); *H02N 2/0015* (2013.01); *H02N 2/105* (2013.01); *H02N 2/22* (2013.01); *Y10T 29/42* (2015.01)

(58) Field of Classification Search
CPC ....... H02N 2/0015; H02N 2/006; H02N 2/10; H02N 2/103; H02N 2/106
USPC .................... 310/323.01–323.21
See application file for complete search history.

(56) References Cited

U.S. PATENT DOCUMENTS

| 7,309,943 | B2 | 12/2007 | Henderson et al. | |
|---|---|---|---|---|
| 8,217,553 | B2 | 7/2012 | Xu et al. | |
| 2007/0029900 | A1* | 2/2007 | Kang et al. | 310/348 |
| 2010/0247087 | A1* | 9/2010 | Suzuki et al. | 396/133 |
| 2011/0241851 | A1 | 10/2011 | Henderson et al. | |

* cited by examiner

*Primary Examiner* — Derek Rosenau
(74) *Attorney, Agent, or Firm* — LeClairRyan, a Professional Corporation

(57) ABSTRACT

A rotary motor and a method of making the same include a vibrating motor body which has two orthogonal first bending modes and is substantially enclosed within a housing. A shaft is frictionally coupled to the vibrating motor body and is arranged to rotate in at least one direction about a rotation axis in response to the vibrating motor body. The shaft is frictionally coupled the vibrating motor body by a force substantially perpendicular to the rotation axis. One or more bearings support the shaft, are connected to the housing, and define the axis of rotation of the shaft.

24 Claims, 24 Drawing Sheets

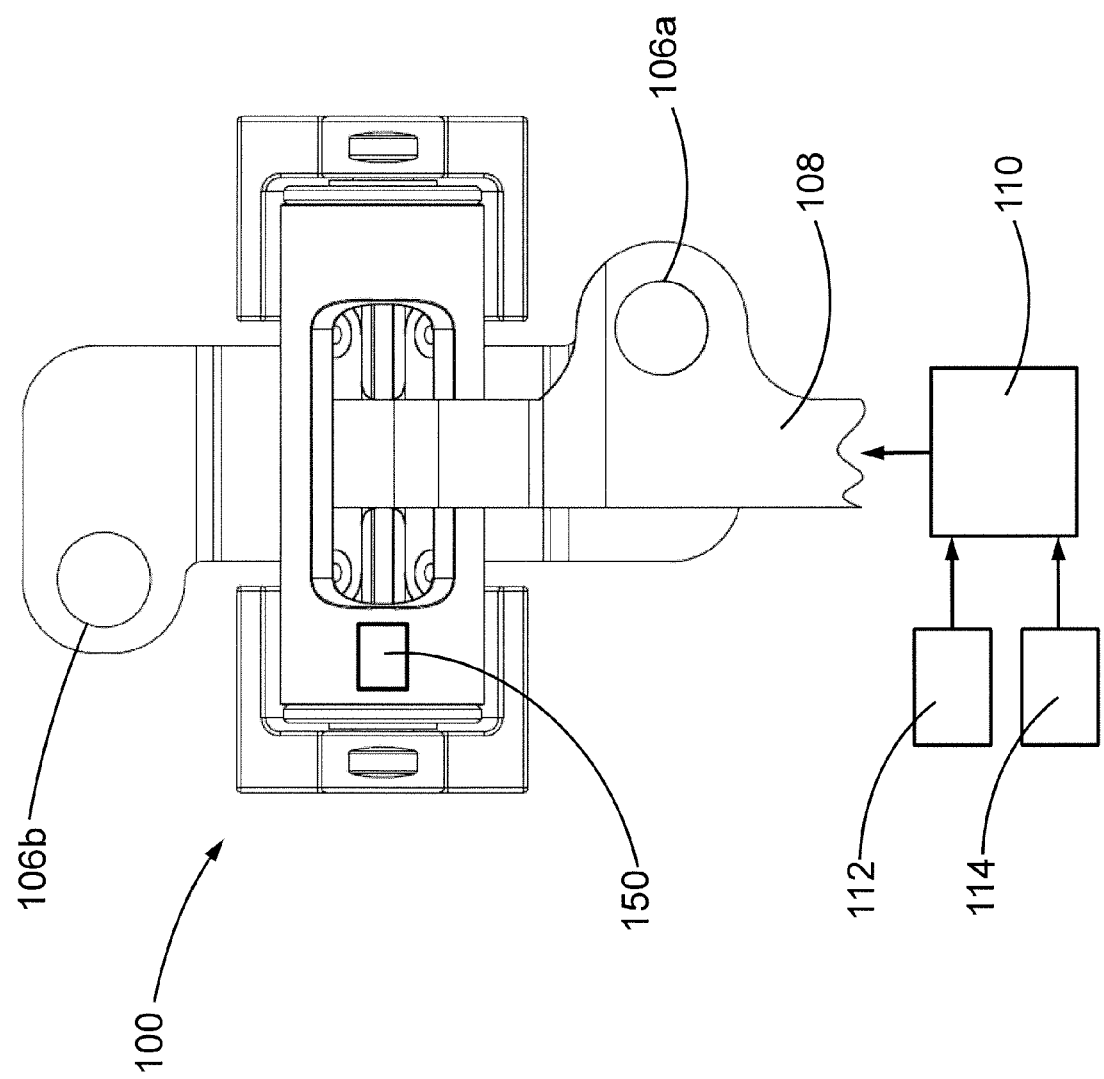

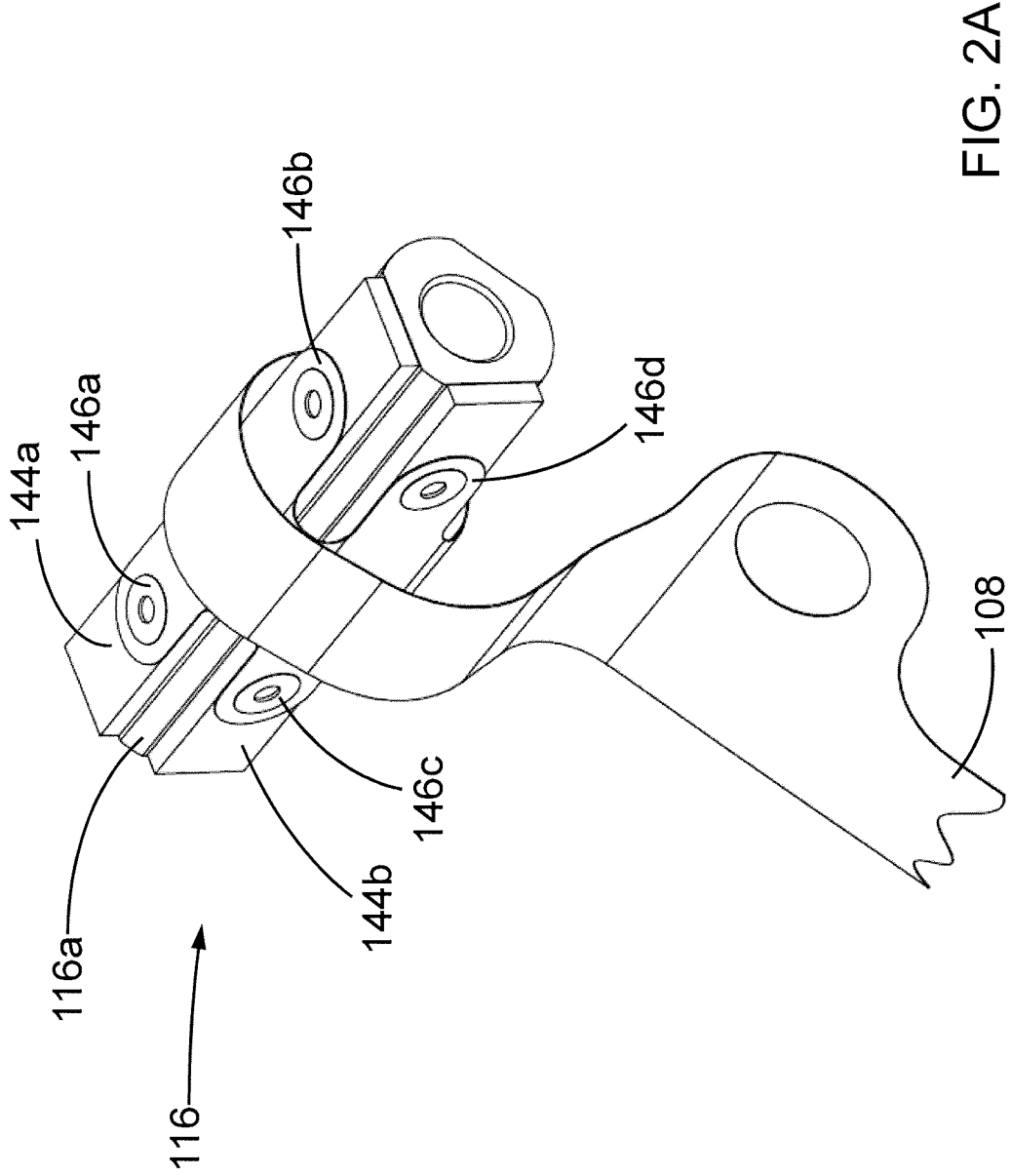

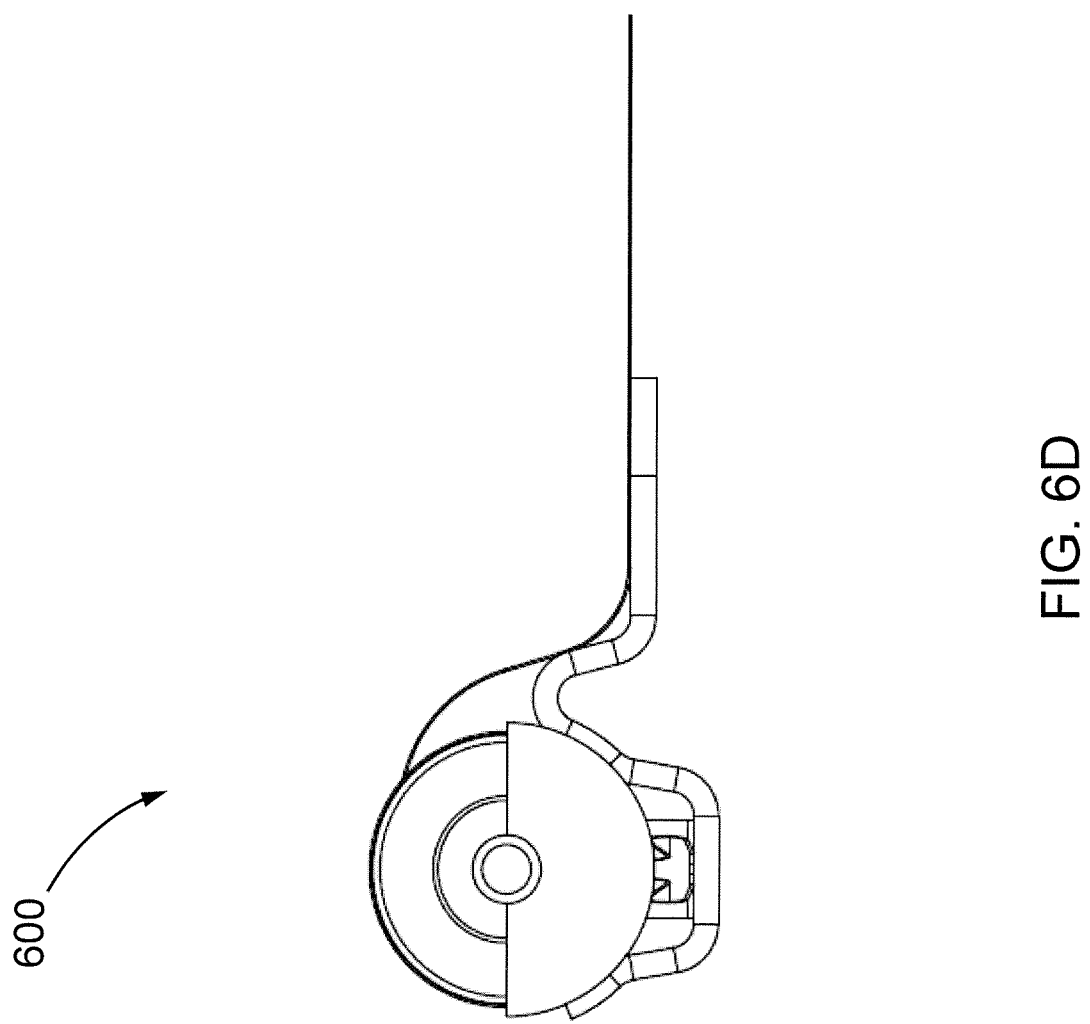

ROTARY MOTOR SYSTEMS AND METHODS THEREOF

This application claims the benefit of U.S. Provisional Application No. 61/693,665, filed Aug. 27, 2012 which is hereby incorporated by reference in its entirety.

FIELD

The present invention generally relates to rotary motors, and more particularly, to piezoelectric ultrasonic rotary motor systems which may include an attached unbalanced mass that generates an oscillating centripetal force perpendicular to an axis of rotation for use as a haptic actuator and methods thereof.

BACKGROUND

Haptic actuators are devices that generate vibrations that can be felt by a person. Haptic actuators have become increasingly important in applications in handheld devices, such as cellphones and smartphones. Additional background information about haptic actuators is disclosed in U.S. Patent Application Publication No. 2011/0241851 to Henderson et al., which is herein incorporated by reference in its entirety.

However, there are some limitations to the maximum reaction force that prior art haptic actuators can produce in practical applications. In particular, the dynamic force (for a small size motor and/or moderate driven power) may not be sufficient to accelerate the entire mobile phone handset and create vibrations that are perceived by the user.

When a motor of small size (e.g., 6 mm in length and up to 2 mm in diameter) is subject to a force of about 20 grams of force (20 gf) at the node points (points on the motor that have the lowest vibration amplitude for a first bending mode vibration), the vibration amplitude of the motor begins to be dampened, and the maximum rotation speed of the shaft begins to decrease. Since the centripetal force is about 0.63 N (over 60 gf) for 200 Hz rotation of a typical rotating (Tungsten) mass of 0.4 grams offset about 1 mm from the centreline of the shaft rotation, and it acts upon antinode points of the motor (both ends or center which have the highest vibration amplitudes for a first bending mode vibration), this centripetal force will dampen the motor vibration even more than the 20 gf preload force at the node points of the motor. Thus, the maximum rotation speed of the shaft is limited (much below 200 Hz) and the resulting centripetal force is not sufficient for many applications.

Another potential limitation for the maximum reaction force is due to the way the motor is mounted. In the prior art, the motor is typically compliantly secured to a housing at the node points by an elastomer material, such as silicone. Unfortunately, the compliance of this mounting method will degrade the transmission of the centripetal force from the rotating unbalanced mass through the motor and then to the housing.

SUMMARY

A rotary motor includes a vibrating motor body which has two orthogonal first bending modes and is substantially enclosed within a housing. A shaft is frictionally coupled to the vibrating motor body and is arranged to rotate in at least one direction about a rotation axis in response to the vibrating motor body. The shaft is frictionally coupled the vibrating motor body by a force substantially perpendicular to the rotation axis. One or more bearings support the shaft, are connected to the housing, and define the axis of rotation of the shaft.

A method of making a rotary motor includes providing a vibrating motor body which has two orthogonal first bending modes and is substantially enclosed within a housing. A shaft is frictionally coupled to the vibrating motor body by applying a force substantially perpendicular to the rotation axis. The shaft is arranged to rotate in at least one direction about a rotation axis in response to the vibrating motor body. One or more bearings are provided that support the shaft, are connected to the housing, and define the axis of rotation of the shaft.

This exemplary technology provides a number of advantages including providing more effective and efficient piezoelectric ultrasonic rotary motor apparatuses and methods. For example, this technology achieves a significant decrease in the dampening of the motor body and thus high vibration amplitude of the motor body and a high rotation speed of the shaft. Additionally, this technology reduces drag and system volume/length, as well as reducing stress inside the shaft during drop testing.

BRIEF DESCRIPTION OF THE DRAWINGS

FIG. 1C is a partial top view and partial block diagram of exemplary rotary motor shown in FIG. 1A;

FIGS. 2A and 2B are the end view and isometric view of a tubular motor body and a wrapped around flexible printed circuit board of the exemplary rotary motor illustrated in FIGS. 1A-1G;

FIGS. 6B-6D are a side view, top view, and end view, respectively, of the exemplary rotary motor as illustrated in FIG. 6A.

DETAILED DESCRIPTION

Figure 1A:
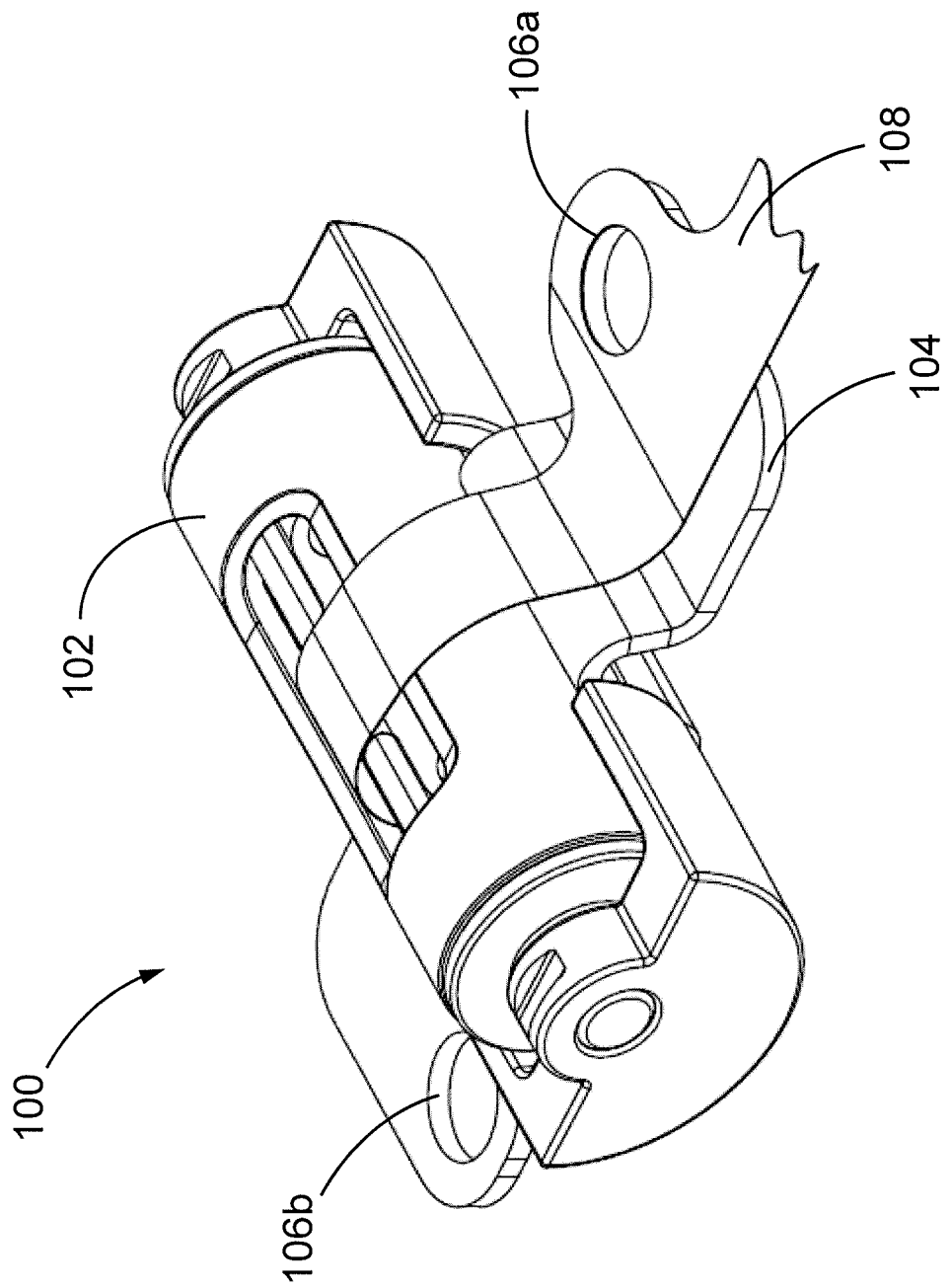
FIG. 1A is an isometric view of an example of a rotary motor.
Figure 1B:
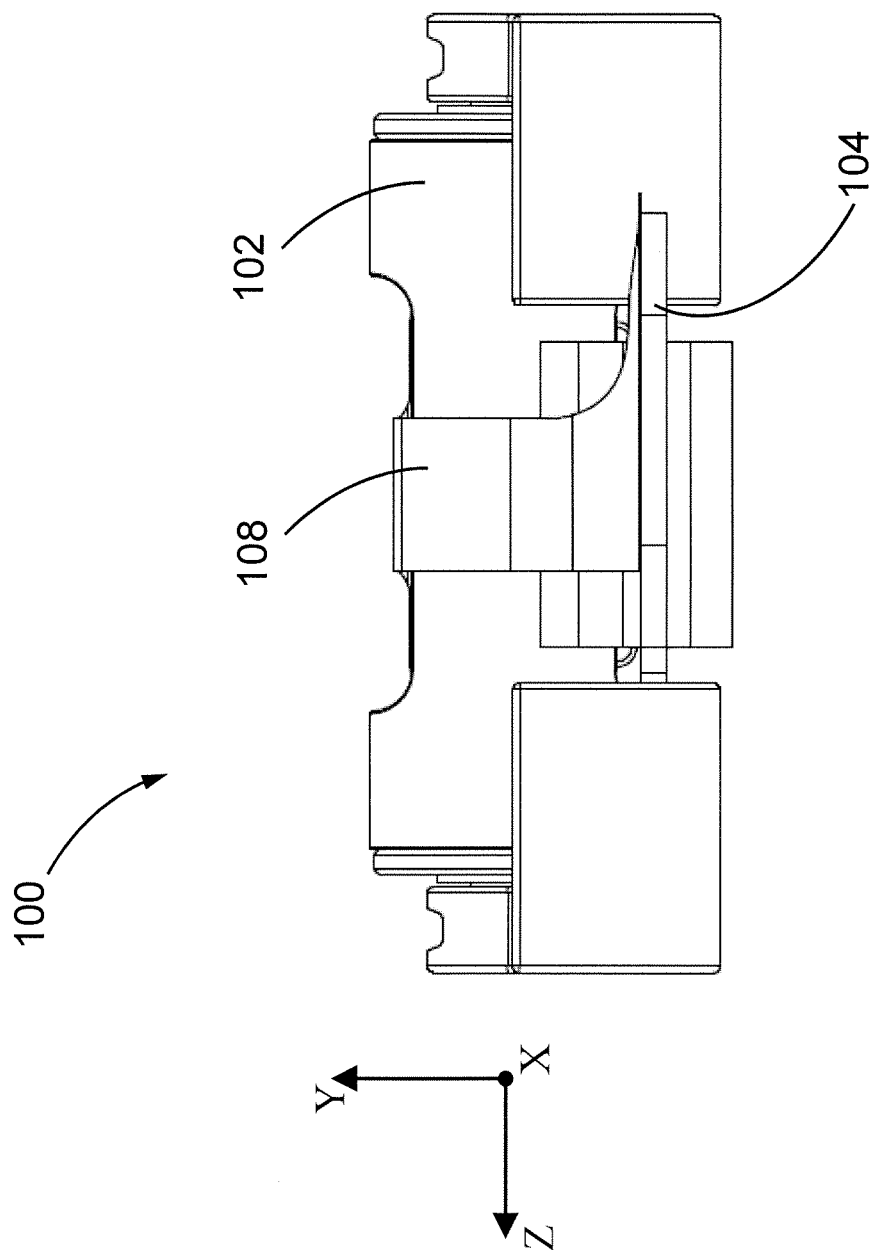
FIG. 1B is a side view of the exemplary rotary motor shown in FIG. 1A.
Figure 1D:
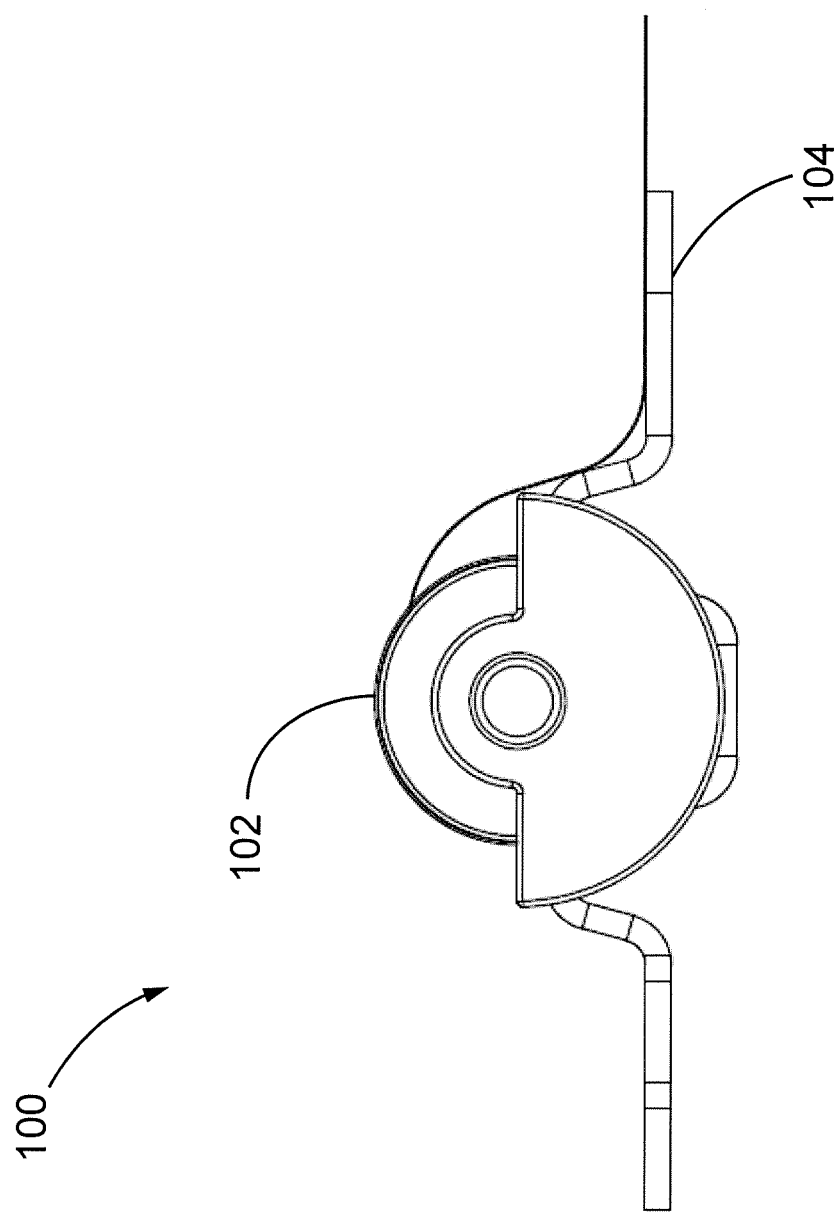
FIG. 1D is end view of the exemplary rotary motor shown in FIG. 1A.

An exemplary rotary motor system 100 is illustrated in FIGS. 1A-2E. The exemplary rotor motor system 100 includes a tubular cage or housing 102, a mount 104, a flexible printed circuit board 108, an integrated driver IC 110, a DC voltage source 112, an interface 114, a tubular vibrating motor body 116 including a main body 116a and piezoelectric plates 144a and 144b, a spring 120, rotating shaft 124, symmetrical unbalanced masses 132a and 132b, bearings 136a and 136b, washers 140a, 140b, 142a and 142b, and optional rotational sensor 146, although the motor system 100 could include other types and numbers of systems, devices, components and other elements in other configurations. The rotation axis of the rotary motor system 100 or the motor axis Z is indicated in FIG. 1B. This exemplary technology provides a number of advantages including providing more effective and efficient piezoelectric ultrasonic rotary motor apparatuses and methods.

Figure 1E:
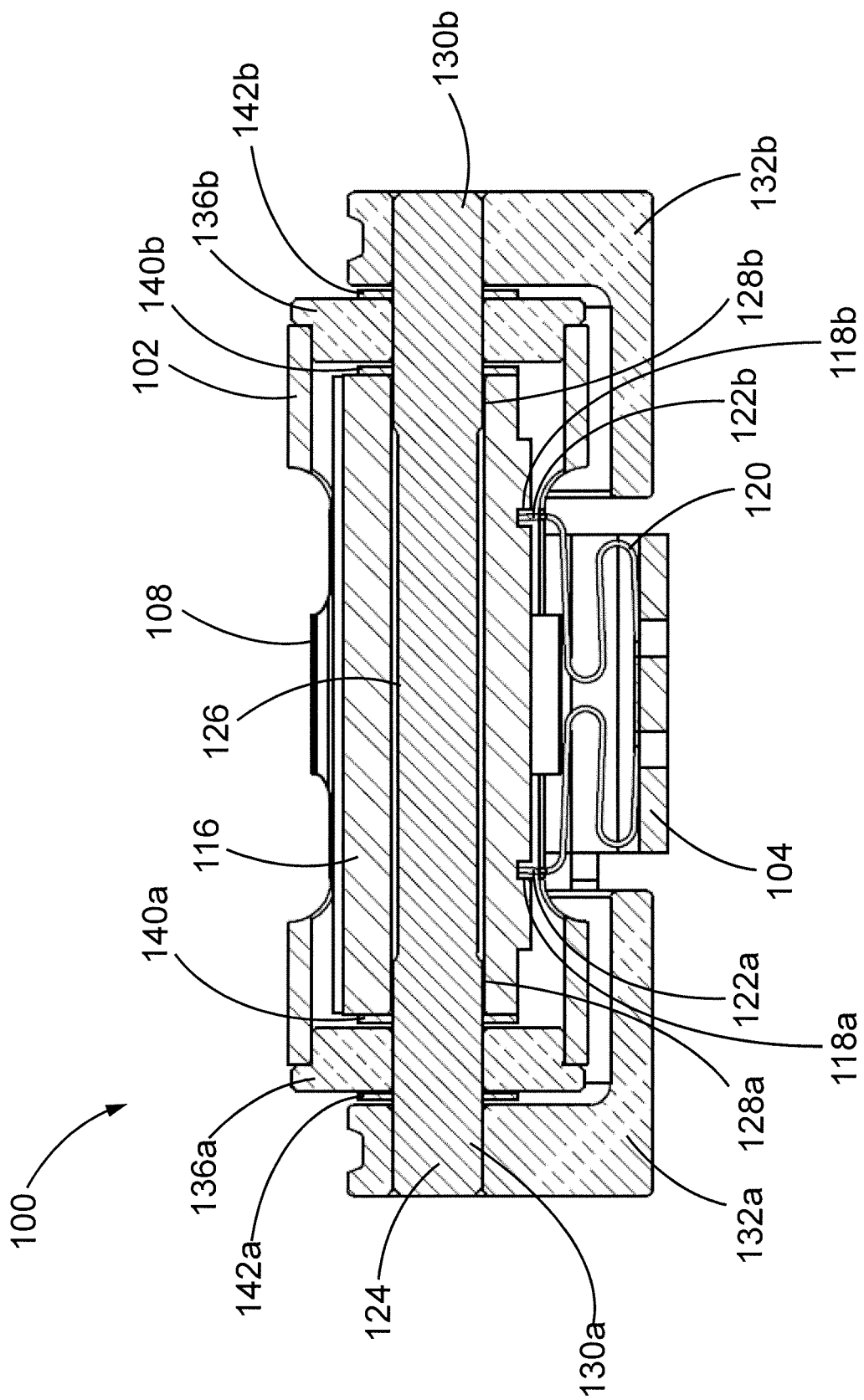
FIGS. 1E-1G are a side sectional view, a top sectional view, and an end sectional view of the exemplary rotary motor shown in FIG. 1A.
Figure 1F:
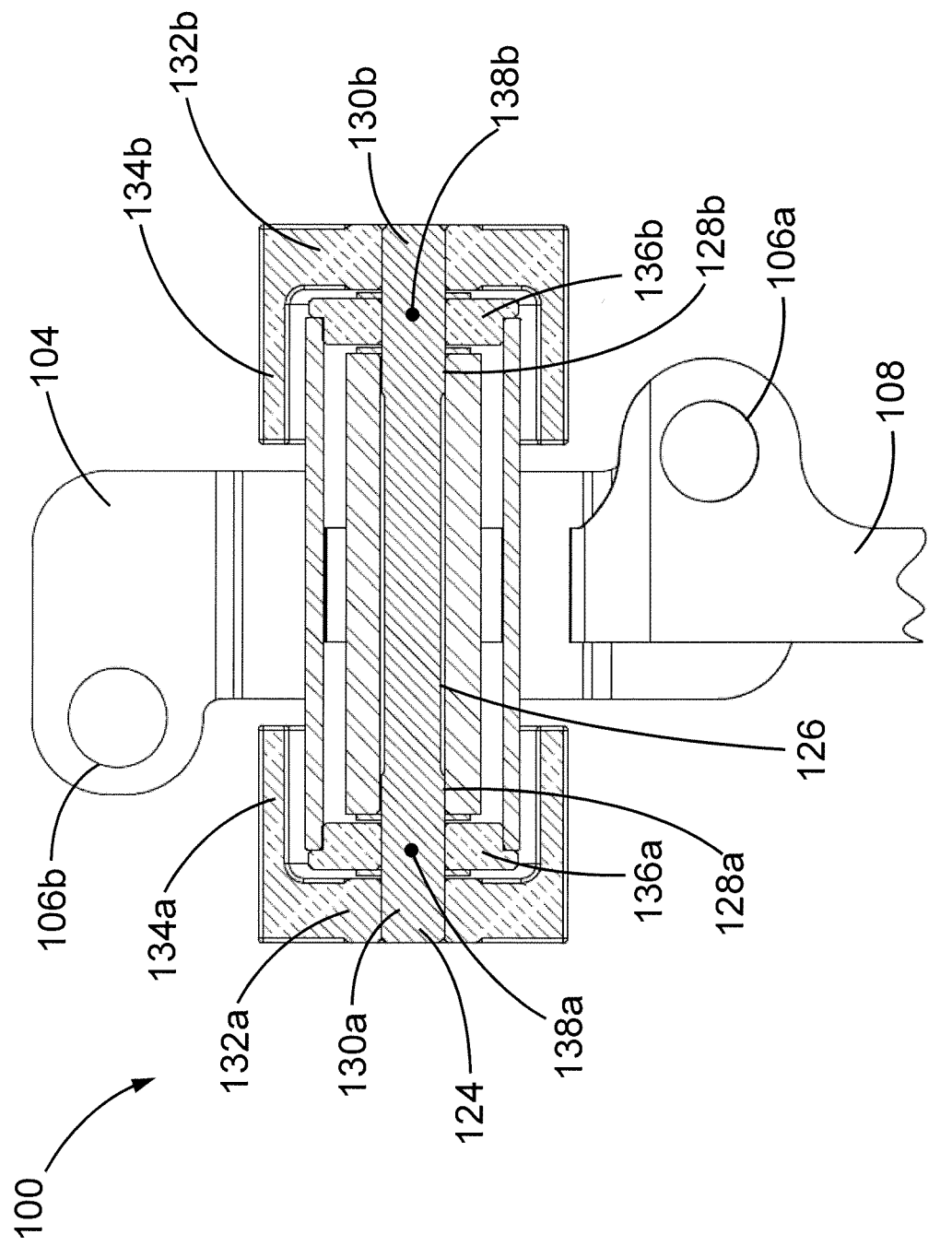
Figure 1G:
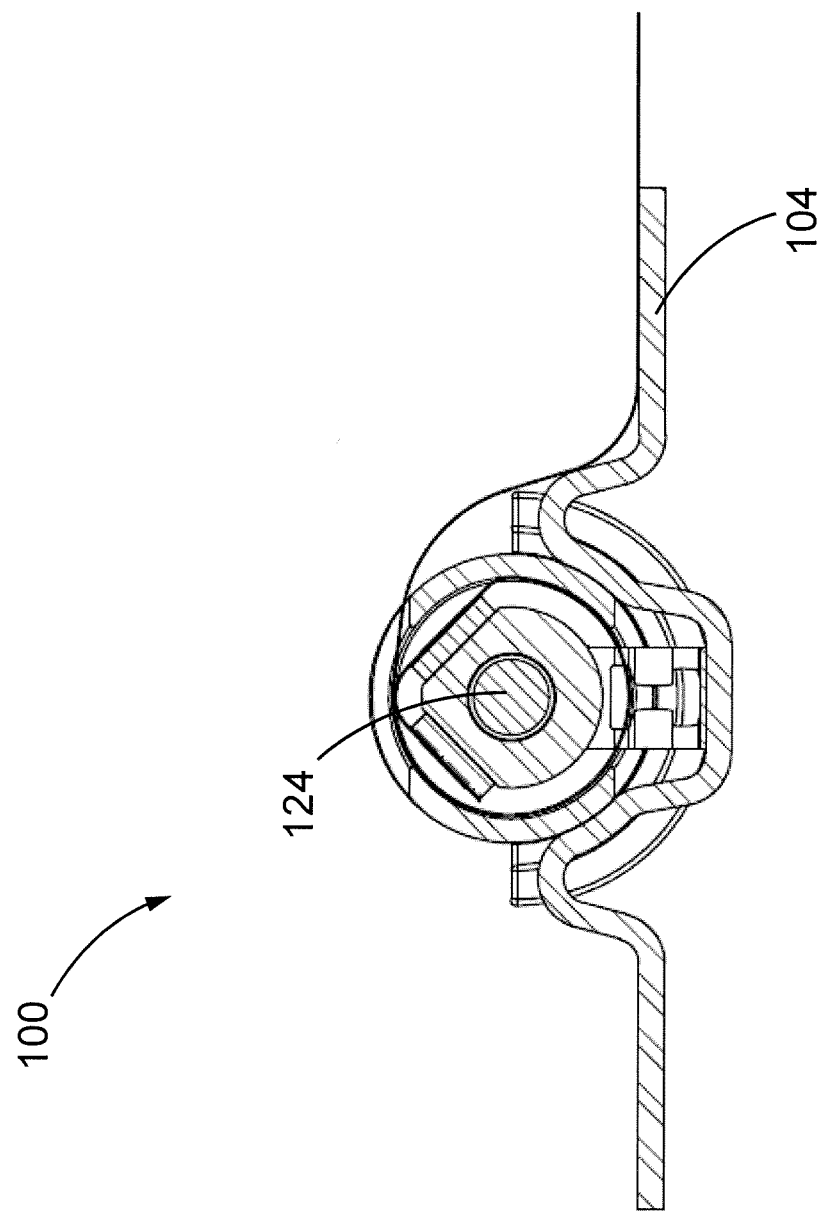

Referring to FIGS. 1A-1G, the tubular cage or housing 102 is secured to the mount 104 by welding, although other types and numbers of mounts can be used. In this example, the mount 104 also has mounting holes 106a and 106b, as illustrated in FIGS. 1A, 1C, and 1F, which may be used to secure the rotary motor system 100 to a device, such as a mobile phone (not shown), although mount 104 may include other types and numbers of mount supporting elements.

Referring again to FIGS. 1A-1E, the flexible printed circuit board 108 receives and transmits signals to the tubular motor body 116 to ultrasonically vibrate the tubular motor body 116. A variety of suitable printed circuit boards are disclosed by way of example in U.S. Pat. No. 7,309,943 which is incorporated by reference in its entirety, although the flexible printed circuit board could include other types and numbers of elements configured to execute other types and numbers of functions. In this example, as illustrated in FIG. 1C, the flexible printed circuit board 108 is coupled to the integrated driver IC 110, which generates the driving signals to drive the tubular motor body 116, such as the integrated driver IC described in U.S. Patent Application Publication No. 2011/0241851, which is herein incorporated by reference in its entirety. The integrated driver IC 110 is coupled to a power source 112, such as a DC voltage source, and an interface device 114, although other types and numbers of systems, devices, components and elements may be coupled together in other configurations. The interface device 114 may be used to operatively establish a connection and communicate between the rotary motor system 100 and a device, such as a mobile phone (not shown). In one example, the interface device 114 is an I²C serial control interface, although other types and numbers of interface devices may be contemplated to provide a wired connection between the rotary motor system 100 and a device.

Referring again to FIGS. 1A-1G, the tubular motor body 116 is located inside the tubular cage or housing 102, although other types and numbers of motor bodies, such as by way of example only the one disclosed in U.S. Patent Application Publication No. 2011/0241851, which is herein incorporated by reference in its entirety, which are in other locations could be used.

Referring now to FIGS. 2A-2E, an exemplary tubular motor body 116 is illustrated. The tubular motor body 116 includes a main body 116a and piezoelectric plates 144a and 144b. The main body 116a is constructed of a solid material, such as metals, polymers or ceramics by way of example only, such that the tubular motor body 116 may vibrate with low loss and high mechanical quality factor (Qm) at ultrasonic frequencies up to several hundred Kilohertz, although the main body 116a may be constructed of other types and numbers of suitable materials. In this example, the main body 116a provides two significantly orthogonal first bending vibration modes which have substantially equal resonant frequencies, although the main body 116a could provide other types and numbers of bending modes.

The main body 116a is bonded to a pair of piezoelectric plates 144a and 144b, although the main body 116a may be attached to other numbers and types of piezoelectric elements at different locations. In this example, the piezoelectric plates 144a and 144b are co-fired multilayer devices, although other piezoelectric plates, such as single layer piezoelectric plates may be used. The piezoelectric plates 144a and 144b are bonded to the main body 116a using high strength adhesive, although other suitable bonding techniques may be used. Further explanation of piezoelectric ceramic materials and how they are used to generate ultrasonic vibrations is contained in U.S. Pat. No. 8,217,553, which is herein incorporated by reference in its entirety.

Figure 2B:
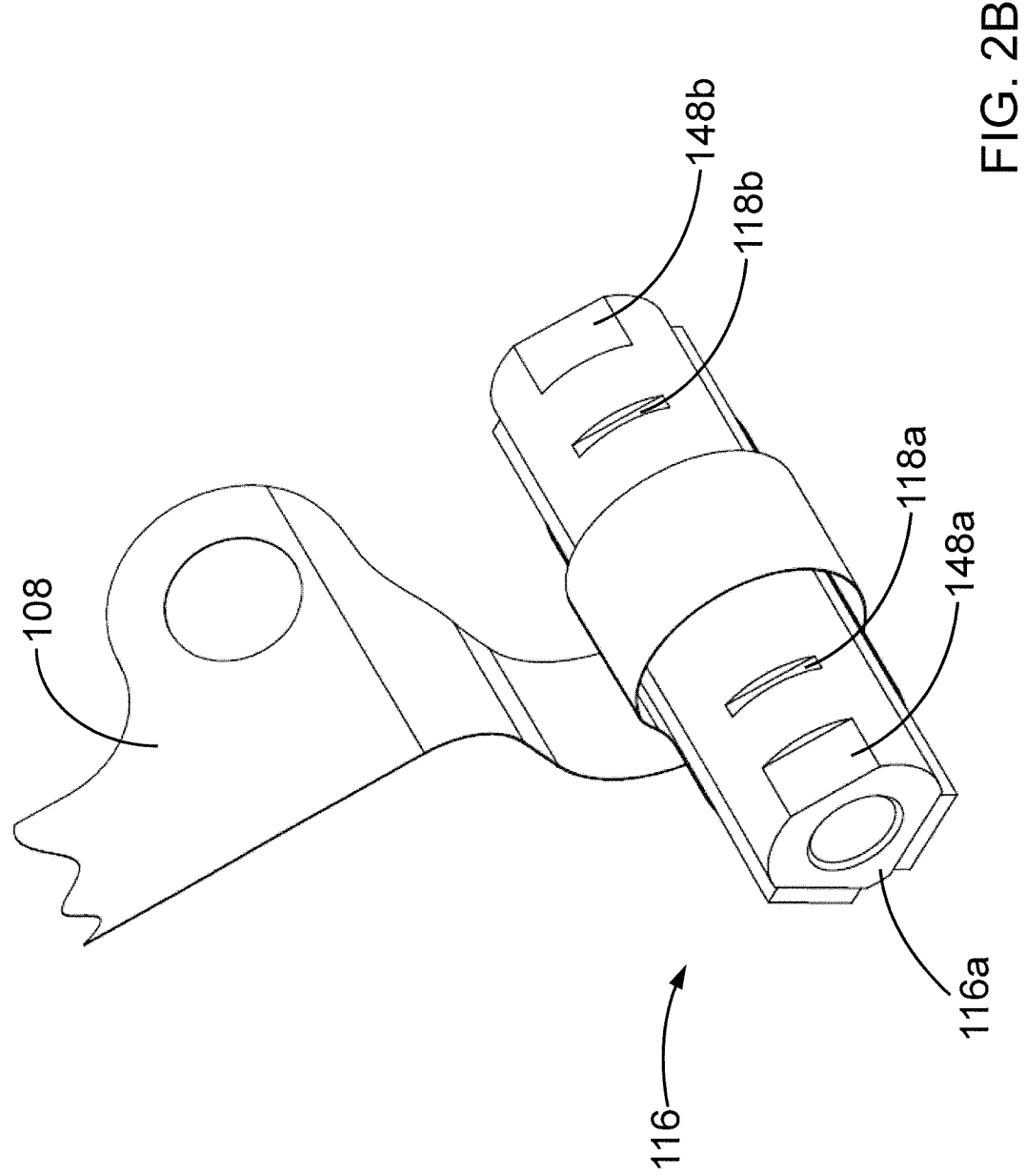
Figure 2C:
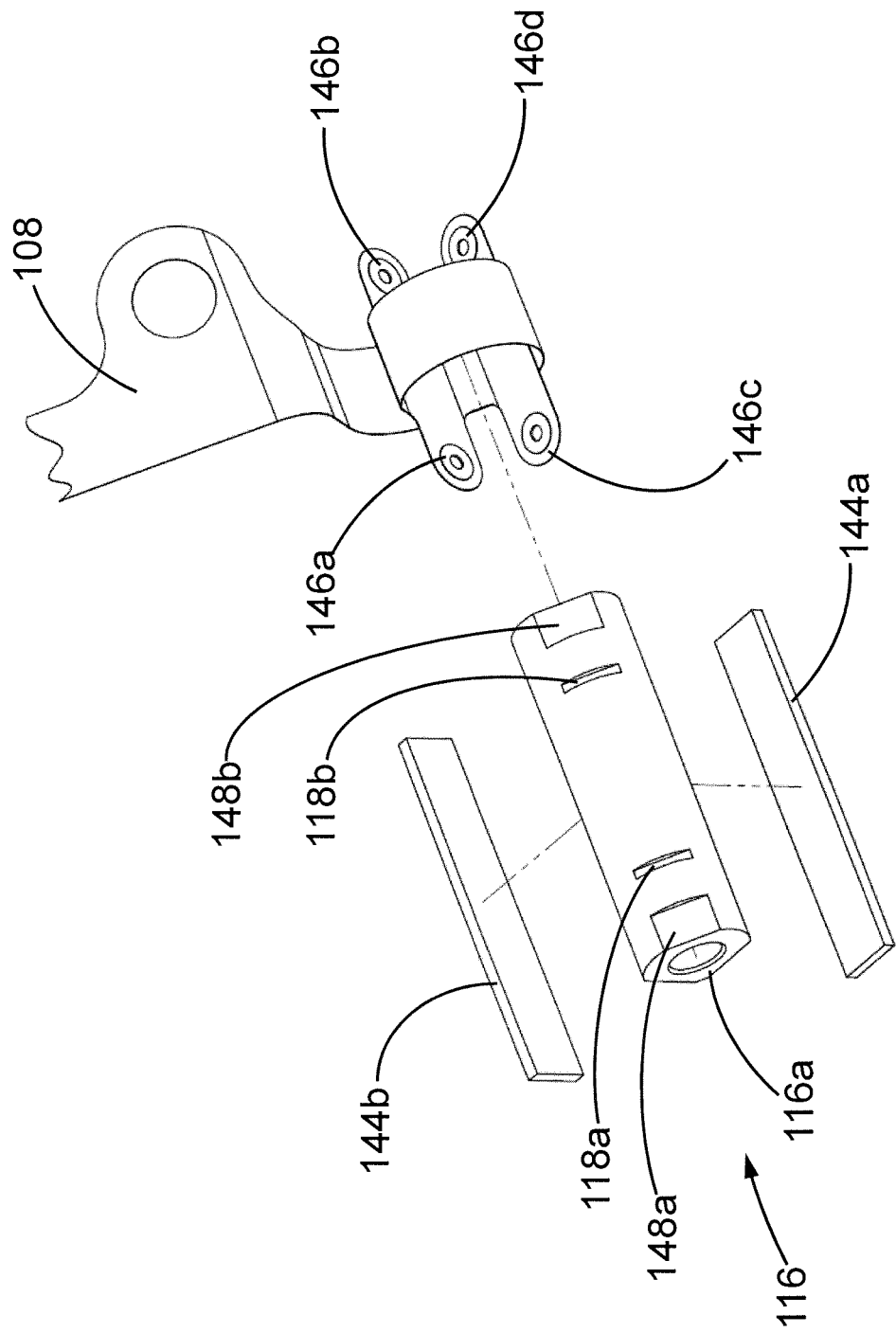
FIG. 2C is an exploded view of a tubular motor body and a wrapped around flexible printed circuit board of the exemplary rotary motor as illustrated in FIGS. 1A-1G.
Figure 2D:
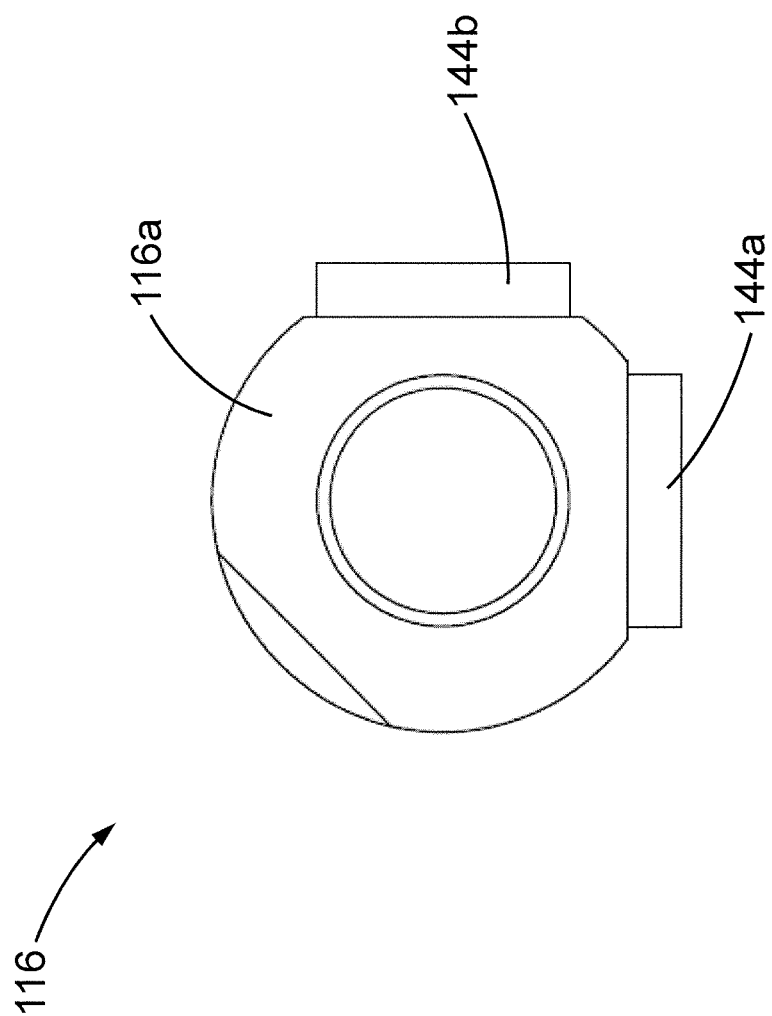
FIG. 2D is an end view of a tubular motor body of the exemplary rotary motor as illustrated in FIGS. 1A-1G.
Figure 2E:
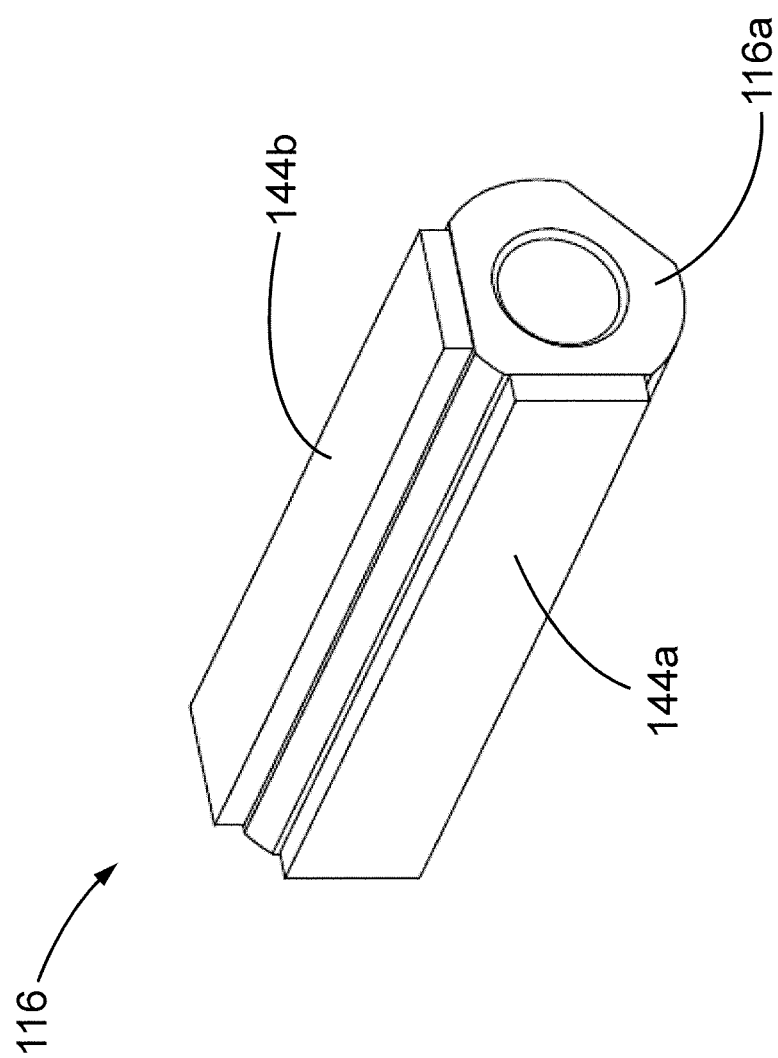
FIG. 2E is an isometric view of a tubular motor body of the exemplary rotary motor as illustrated in FIGS. 1A-1G.

Referring to FIGS. 2A-2C, in this example, the flexible printed circuit board 108 is wrapped around the tubular motor body 116, although other configurations may be used. As illustrated in FIGS. 2A and 2C, the flexible printed circuit board includes electrodes 146a, 146b, 146c, and 146d which are attached to the piezoelectric plates 144a and 144b to apply a voltage to the piezoelectric plates 144a and 144b, although other types and numbers of voltage applying elements may be used.

Referring to FIG. 2B, in this example, main body 116a of the tubular motor body 116 includes additional cuts 148a and 148b located at the ends of the main body 116a which are used to fine tune the resonant frequencies of the first order bending resonant modes so that they are substantially the same, although the main body 116a may have other numbers and types of resonant frequency tuning elements and/or configurations in other locations.

The main body 116a includes notches 118a and 118b which are located at node points of the main body 116a, as illustrated in FIGS. 2B and 2C although other types and numbers of node locators could be used. In this example, the notches 118a and 118b are used to secure the preload spring 120 to the main body 116a, although other manners for securing a preloaded force can be used. End sections 122a and 122b of the spring 120 are pressed into the notches 118a and 118b of the main body 116a, respectively. The preload spring 120, illustrated in FIGS. 3A-3D, is pressed between the main body 116a and the top surface of the mount 104 to provide constant preload force between the main body 116a and the mount 104.

Figure 3A:
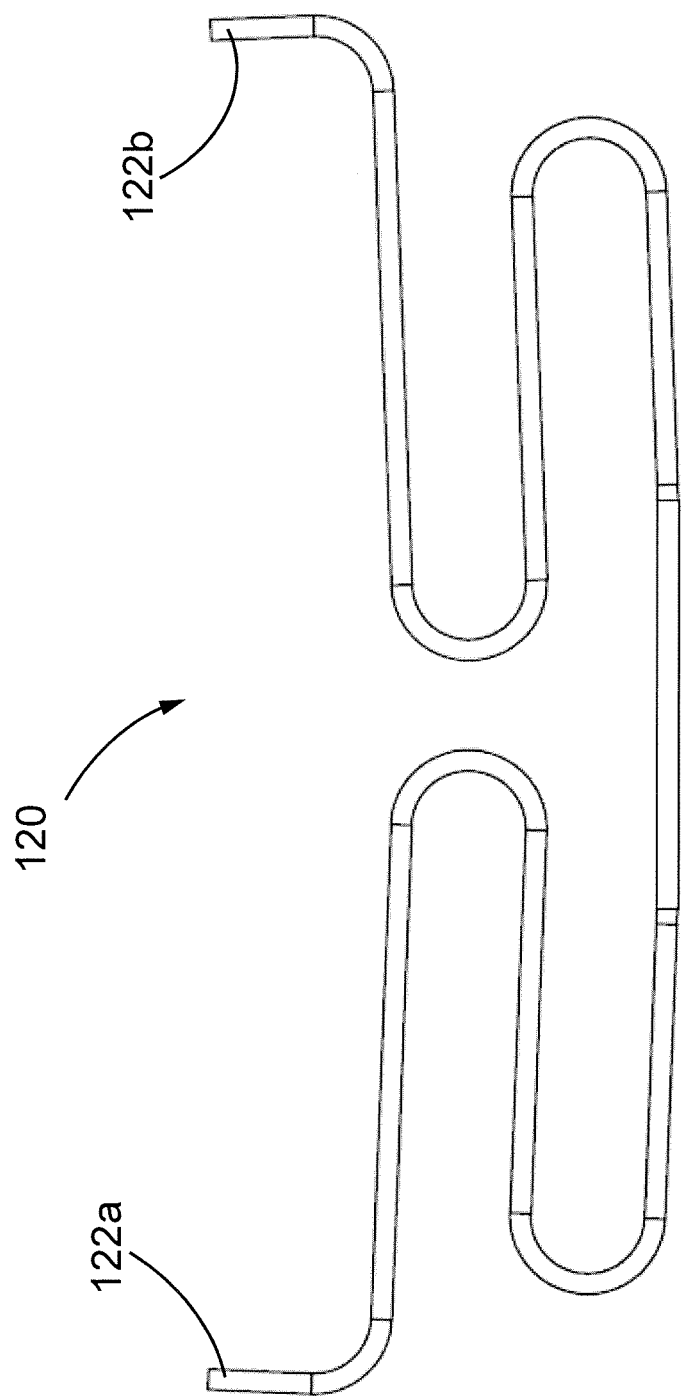
FIGS. 3A and 3B are the side view and isometric view of an example preload spring in the loaded state used for the rotary motor illustrated in FIGS. 1A-1G.
Figure 3B:
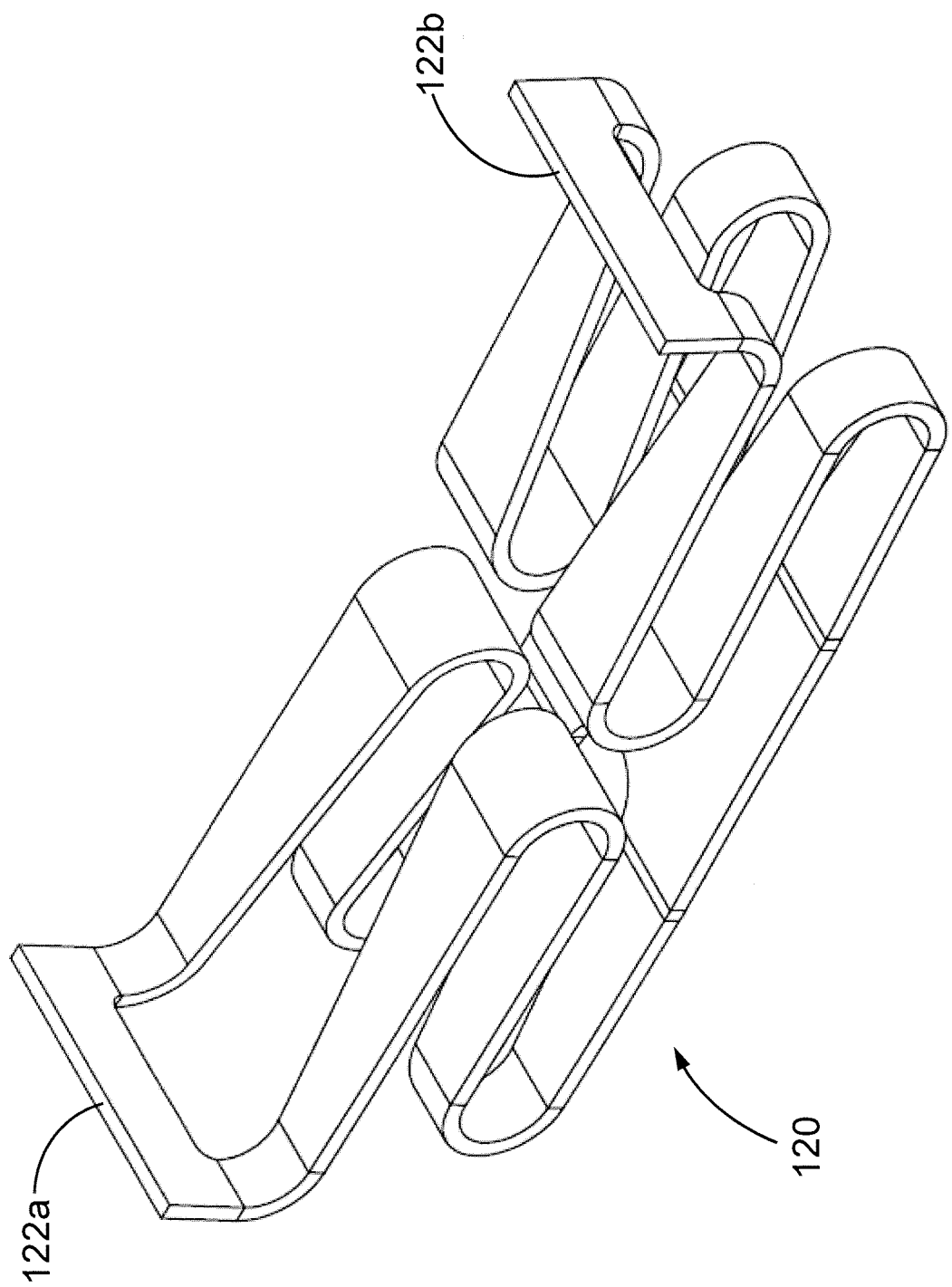
Figure 3C:
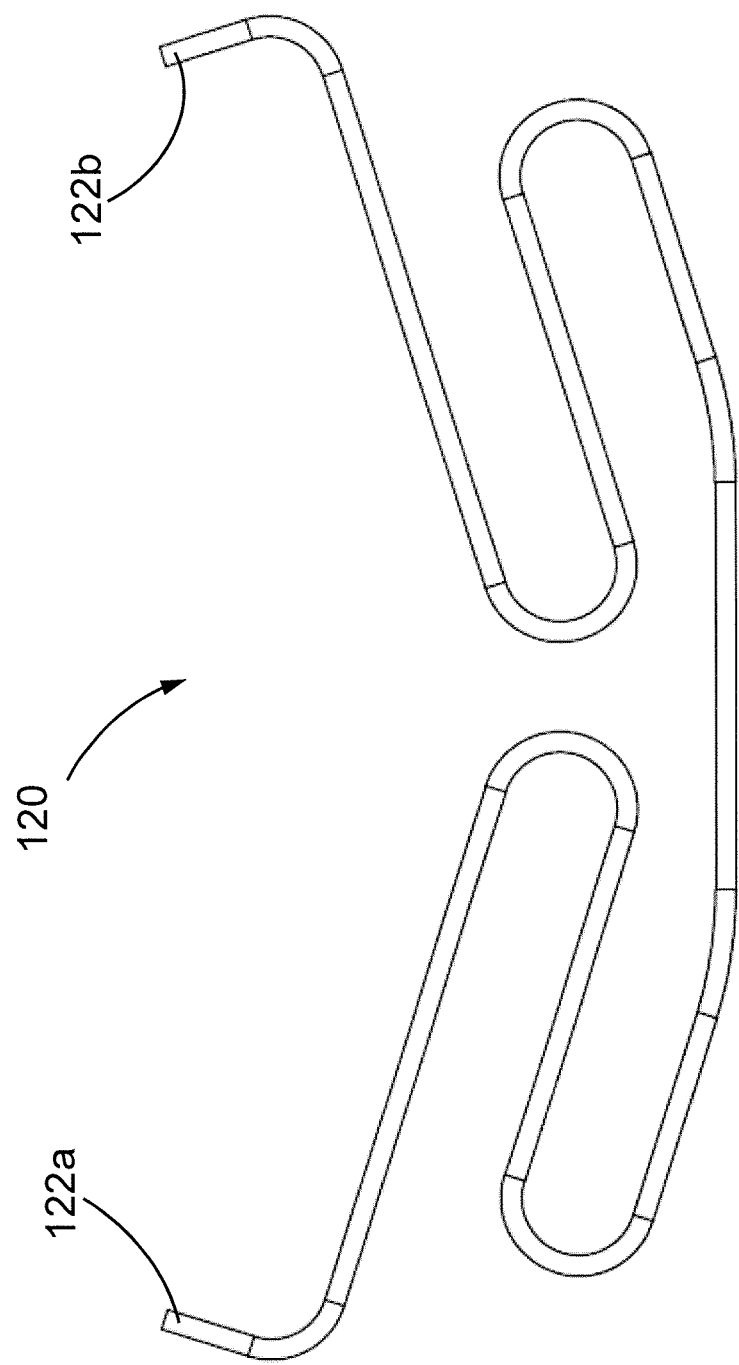
FIGS. 3C and 3D are the side view and isometric view of an example preload spring in the relaxed state used for the rotary motor shown in FIGS. 1A-1G.
Figure 3D:
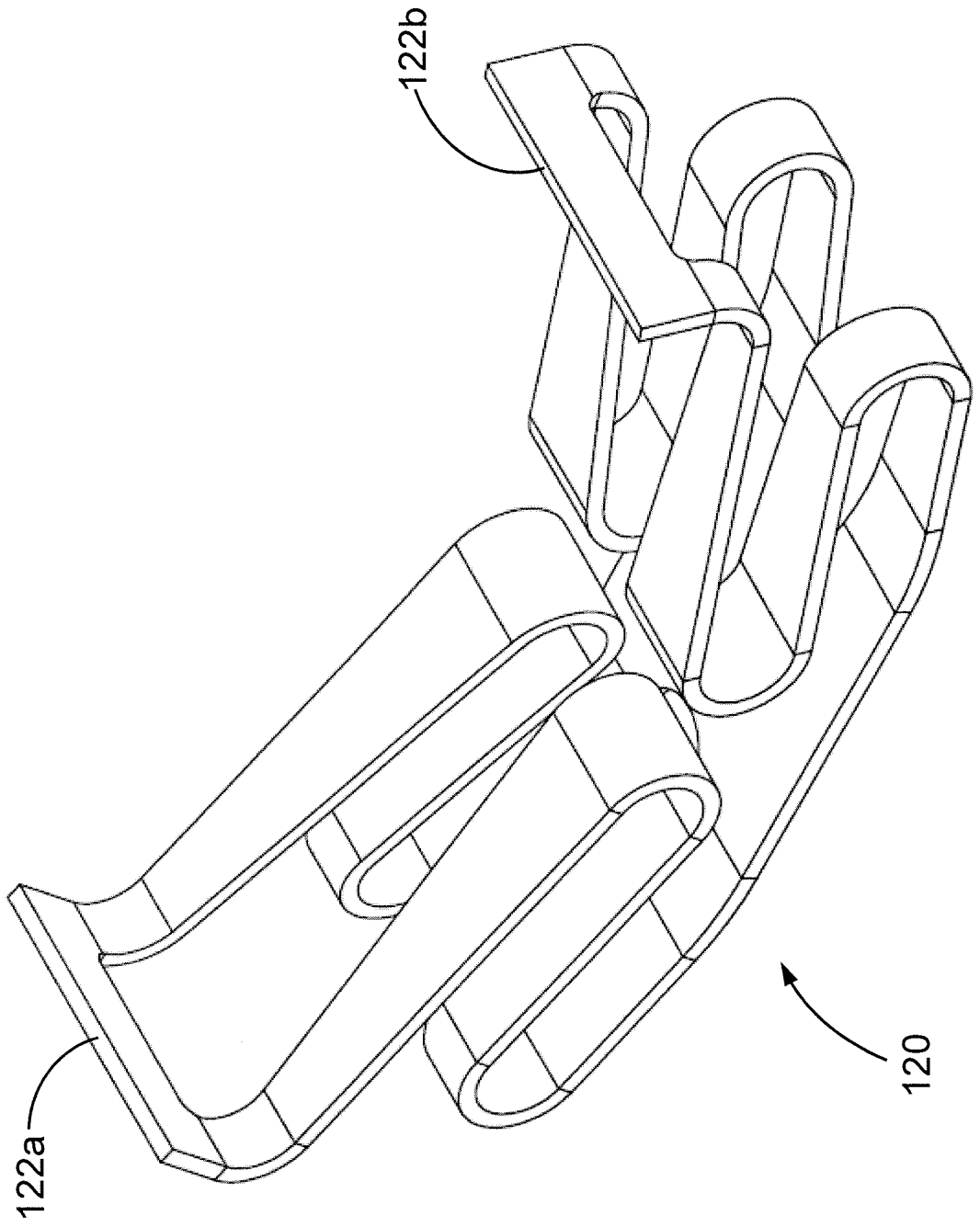

Referring now to FIGS. 3A and 3B, spring 120 is illustrated in a loaded state with a targeted preload force. Spring 120 in a relaxed or free state is shown in FIGS. 3C and 3D. In this example, the spring 120 is made of high strength stainless steel, although other suitable materials, such as elastomers by way of example only, may be used. The spring 120 is engineered to have proper stiffness for easy manufacturing tolerance and to provide rotational stability for the rotary motor system 100. The configurations of the spring 120 illustrated in FIGS. 3A-3D are exemplary and other suitable shapes and configurations may be contemplated.

Referring again to FIGS. 1A-1G, the rotating shaft 124 is located inside and extends throughout the main body 116a, although the rotating shaft may be in other locations with other lengths. As illustrated in FIGS. 1E and 1F, the diameter of the shaft 124 is slightly smaller than the inner diameter of the main body 116a, although other configurations may be used. In this example, the shaft 124 includes an optional necked down section 126 with a decreased diameter, such that the tubular motor body 116 may only drive the shaft 124 at drive sections 128a and 128b, where the corresponding motor vibration amplitude is at a maximum, although other configurations such as, by way of example only, bushing pads may be bonded to the inside of the tube 102 or outside the shaft 124 at drive sections 128a and 128b. The shaft 124 also has end portions 130a and 130b, which extend outside of the tubular motor body 116, although the shaft 124 could have other positions.

In the exemplary embodiment shown in FIGS. 1A-1G, end portions 130a and 130b of the shaft 124 are attached to symmetrical unbalanced masses 132a and 132b, respectively, such that rotary motor system 100 is configured to act as a haptic actuator, although the exemplary rotary motor system 100 may or may not be attached to other objects and devices at different locations along the shaft 124 to provide other types and numbers of functions.

In this example, the unbalanced masses 132a and 132b are attached to the shaft 124 through a crimp/press fit, although the masses can be attached in other manners, such as with a high strength adhesive by way of example only. In this example, the unbalanced masses 132a and 132b include wrap-around or cantilevered portions 134a and 134b, although the unbalanced masses may have other shapes and configurations. The cantilevered portions 134a and 134b reduce the actuator length along the motor axis and the actuator volume while the mr product is fixed.

Bearings 136a and 136b are pressed into the ends of tubular cage 102 and serve as a guide for the rotating shaft 124, as shown in FIGS. 1E and 1F, although other types and numbers of guides for the shaft 124 can be used. The bearings 136a and 136b may be simple journal bearings, which may be made of various materials, including oilite bearing material (oilite bronze), bronze, or plastics by way of example only, although the bearings 136a and 136b may be other types of bearings, such as ball bearings by way of example only. The bearings 136a and 136b provide long lasting low friction and small diametrical play (typically 5 to 15 micrometers) for the shaft 124, although the bearings may provide other advantages.

The configuration of the mount 104, the tubular cage 102 and the mounting holes 106a and 106b is designed to solidly connect bearings 136a and 136b to a target device (not shown), such as a mobile phone by way of example only. In this example, cantilevered portions 134a and 134b of the unbalanced masses 132a and 132b, respectively, bring the center of gravity for each mass 138a and 138b inside the bearings 136 and significantly lower the stress inside the shaft 124 during drop testing. It is to be understood that the cantilevered portions 134a and 134b are optional and that different designs with different functions may be utilized.

Washers 140a and 140b are secured in between the tubular motor body 116 and the bearings 136a and 136b, respectively and washers 142a and 142b are secured in between the unbalanced masses 132a and 132b and the bearings 136a and 136b, respectively, although other friction reducing elements may be used. In this example, washers 140a and 140b and 142a and 142b are made of relatively soft and low friction material, such as plastics, although the washers may be made of any other suitable material.

In one example, the rotary motor system 100 includes an optional rotational speed sensor 150, as illustrated in FIG. 1C, to monitor the rotational speed of the unbalanced masses 132a and 132b. The rotational speed sensor 150 detects rotational speed using various physical principles such as capacitive, optical, or magnetic principles, although other methods of measuring the rotational speed may be utilized. In one example, the monitored speed is fed back to the integrated drive 110 so that the rotational speed can be controlled in a controlled loop fashion, although the monitored speed could be provided to other control intefaces.

An exemplary operation of the rotary motor system 100 of the present invention will now be described with reference to FIGS. 1A-2E. The operation of the tubular vibrating motor body 116 of the rotary motor system 100 is the same as described in U.S. Patent Application Publication No. 2011/0241851, which is incorporated herein by reference in its entirety, except as illustrated and described herein. Power source 112 and interface device 114 are connected to the integrated driver IC 110 to create a drive signal. Integrated driver IC 110 generates signals to ultrasonically vibrate the tubular motor body 116. The drive signals are transmitted through the circuit board 108 to the tubular motor body 116. In particular, the voltage signals are applied to the electrodes 146a-146d of piezoelectric plates 144a and 144b.

When voltage signals are applied between the electrodes 146a and 146b of piezoelectric plate 144a and electrodes 146c and 146d of piezoelectric plate 144b, the length of piezoelectric plates 144a and 144b changes. The changes in length of the piezoelectric plates 144a and 144b bends the main body 116a. When the two ultrasonic signals are driven at the first order bending resonant frequency of the tubular motor body 116 and their phase difference is approximately 90 degrees, the tubular motor body 116 will be excited into a "hula-hoop" vibration in this example, which will further cause the shaft 124 to rotate in at least one direction. The tubular motor body 116 drives the shaft 124 at drive sections 128a and 128b where the corresponding vibration amplitude of tubular motor body 116 is at a maximum (antinode points).

The rotational output of the rotary motor system 100 is through the shaft 124. The rotary motor system 100 may be coupled to a device at any point, or a combination of points, along the shaft 124, such as one or both ends of the shaft 124, or somewhere in the middle of the shaft 124. The rotational output of the shaft 124 may be used for various purposes. By way of example only, the rotational output of the shaft 124 may be used to rotate a mirror, a prism, a medical device, a lead screw, or unbalanced masses, such as 132a and 132b, although the rotational output may be used for other types and numbers of purposes.

In the embodiment shown in FIGS. 1A-1G, when the shaft 124 and the unbalanced masses 132a and 132b are driven to the maximum rotation speed, the centripetal force generated by the unbalanced masses 132a and 132b is transmitted through bearings 136a and 136b to the tubular cage or housing 102, the mount 104, and finally to the targeted device, which generates a haptic feeling in the targeted device. Transmission through the bearings significantly causes less dampening of the tubular motor body 116 and thus high vibration amplitude of the tubular motor body 116 and a high rotation speed for the shaft 124. The washers 140a-140b serve to reduce friction and reduce dampening of the tubular motor body 116 from the bearings 136a-136b.

During operation, the node points on the tubular motor body 116 have the least amount of motion during vibration. Preloading the spring 120 at notches 118a and 118b, which are located at the node points of the tubular motor body 116 decreases the amount of interference/damping to the vibration of the rotary motor system 100. The notches 118a and 118b also prevent the preload spring 120 from moving away from or slipping from the node points during operation of the rotary motor system 100.

Spring 120 is preloaded with a force of approximately 15 to 20 gf, which is approximately equally distributed to drive sections 128a and 128b. The reaction forces at drive sections 128a and 128b can generate enough starting (frictional) drive force or torque to overcome the eccentric gravity of the unbalanced masses 132a and 132b and also accelerate it fast enough to meet the spin up time requirement (the rotary motor system 100 is required to reach a certain rotational speed at a specified amount of time).

Figure 4A:
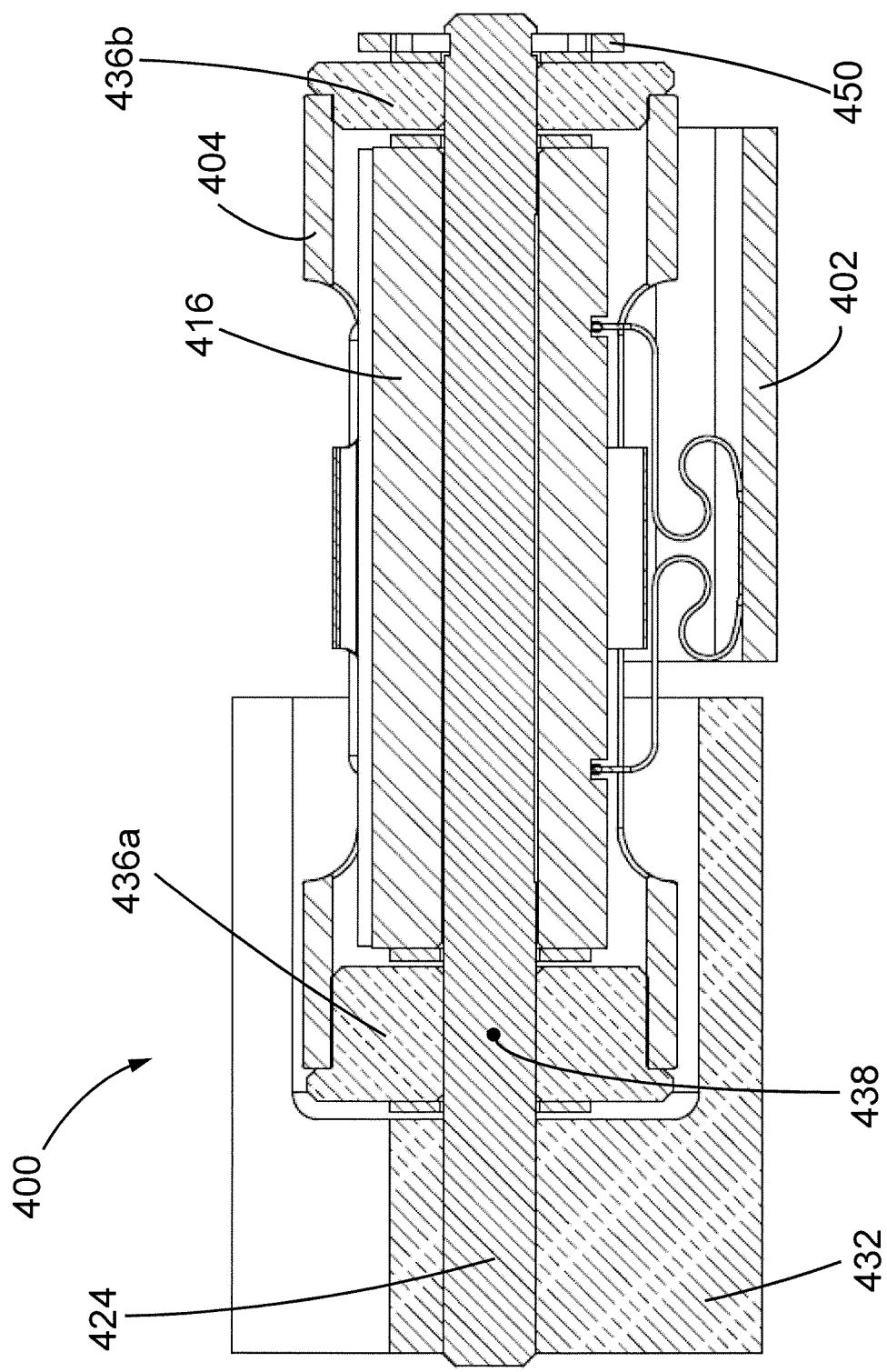
FIG. 4A is side sectional view and isometric view of another example of a rotary motor.
Figure 4B:
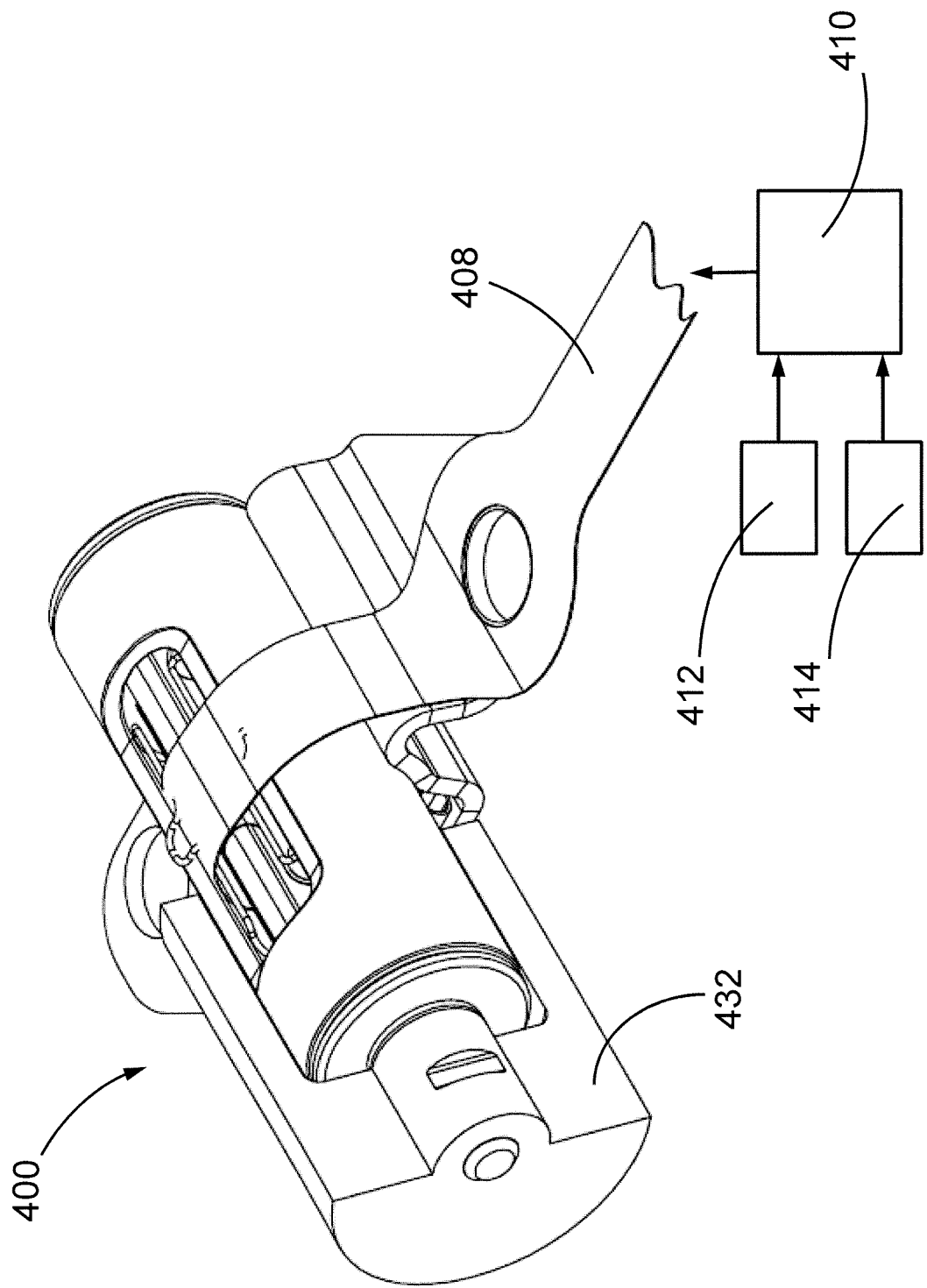
FIG. 4B is a partial isometric view and partial block diagram of the exemplary rotary motor as shown in FIG. 4A.

Referring to FIGS. 4A and 4B, another example of a rotary motor system 400 is shown. Rotary motor system 400 is the same in structure and operation as rotary motor system 100, except as illustrated and described herein. Elements in rotary motor system 400 which are like those in rotary motor system 100 have like reference numerals.

Rotary motor system 400 has a single unbalanced mass 432 attached to the shaft 424, although other elements in other numbers and configurations may be attached to shaft 424. In this example, unbalanced mass 432 is attached to the shaft 424 through a crimp/press fit, although the mass can be attached in other manners, such as with a high strength adhesive by way of example only. In this example, the single unbalanced mass 432 is larger than the unbalanced masses shown attached to rotary motor system 100 shown in FIGS. 1A-1G, although other sizes for the unbalanced mass may be used.

Rotary motor system 400 has a shaft stop or snap ring 450 clamped on the end of shaft 424 opposite the single unbalanced mass 432, although other numbers and types of elements may be clamped on the shaft 424 at different locations along the shaft.

Bearings 436a and 436b serve as guides for the rotating shaft 424, although other types and numbers of guides for the shaft 424 can be used. The bearings 436a and 436b may be simple journal bearings, which may be made of various materials, including oilite bearing material (oilite bronze), bronze, or plastics by way of example only, although the bearings 436a and 436b may be other types of bearings, such as ball bearings by way of example only. In this example, bearing 436a has an increased width to support the necessary drop test requirements, while bearing 436b is designed slightly narrower due to the decreased load, although bearings 436a and 436b may have other shapes and configurations.

In this example, the unbalanced mass 432 has a cantilevered design so that its center of gravity 438 is inside bearing 436a, which significantly lowers the stress inside the shaft during drop test (especially in the direction perpendicular to the motor axis Z), although the unbalanced mass may be designed in other configurations.

As shown in FIG. 4B, integrated driver IC 410 is connected to power source 412 and interface device 414 and integrated driver IC 410 generates the signals to ultrasonically vibrate the tubular motor body 416. The drive signals are transmitted through the cable 408 to the motor body 416 and cause the shaft 424 and unbalanced mass 432 to rotate, although other electronic elements in different configurations may be used to generate the drive signals to operate the rotary motor 400.

In this example, when the shaft 424 and the unbalanced mass 432 are driven to the maximum rotation speed, the centripetal force generated by the unbalanced mass 432 (attached to the rotating shaft 424, which is supported by bearings 436a and 436b) is transmitted through bearings 436a and 436b, the cage or housing 404, the mount 402, and finally to the targeted device (not shown), and hence a haptic feeling is generated.

Figure 5A:
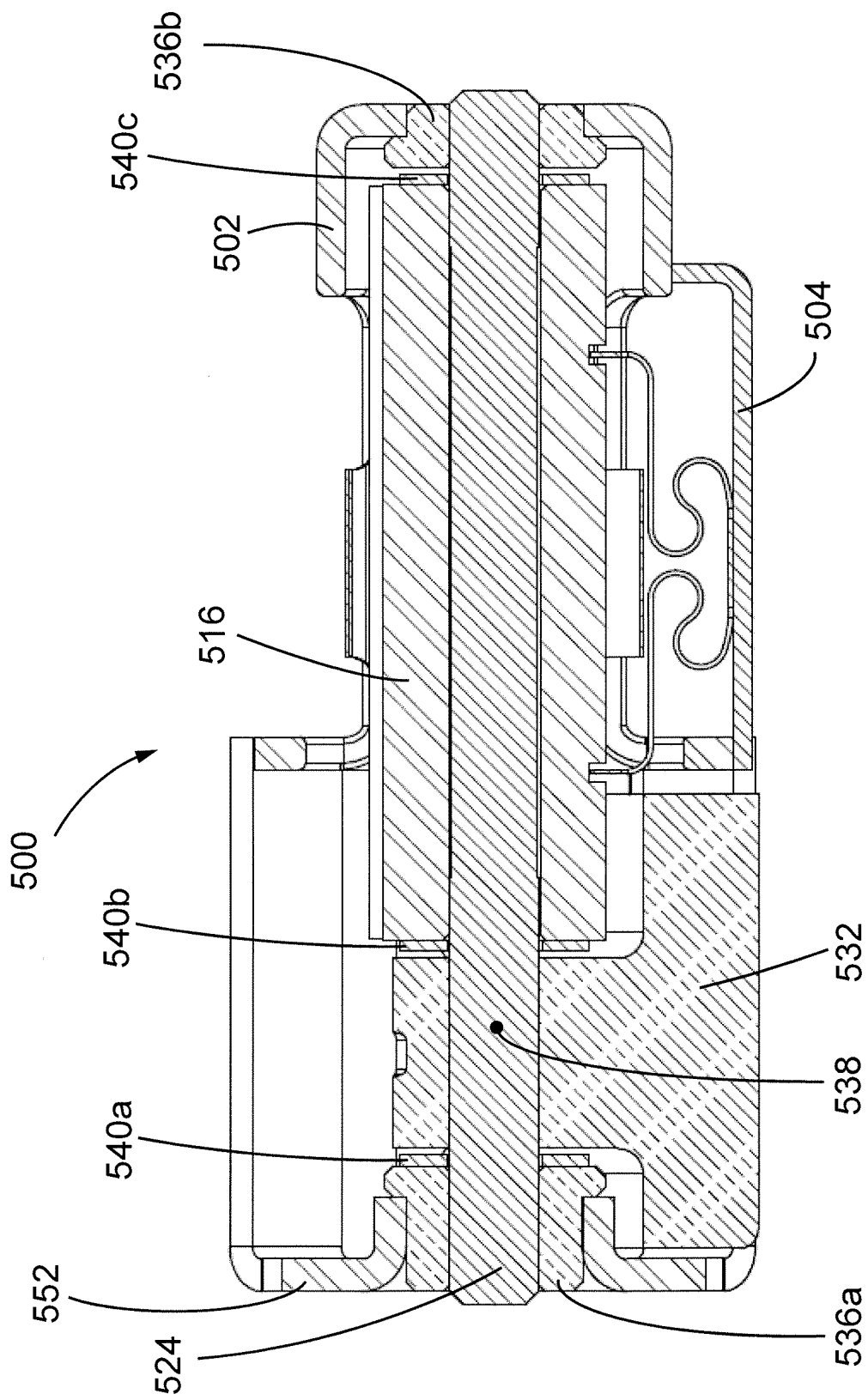
FIG. 5A is a side sectional view of yet another example of a rotary motor.
Figure 5B:
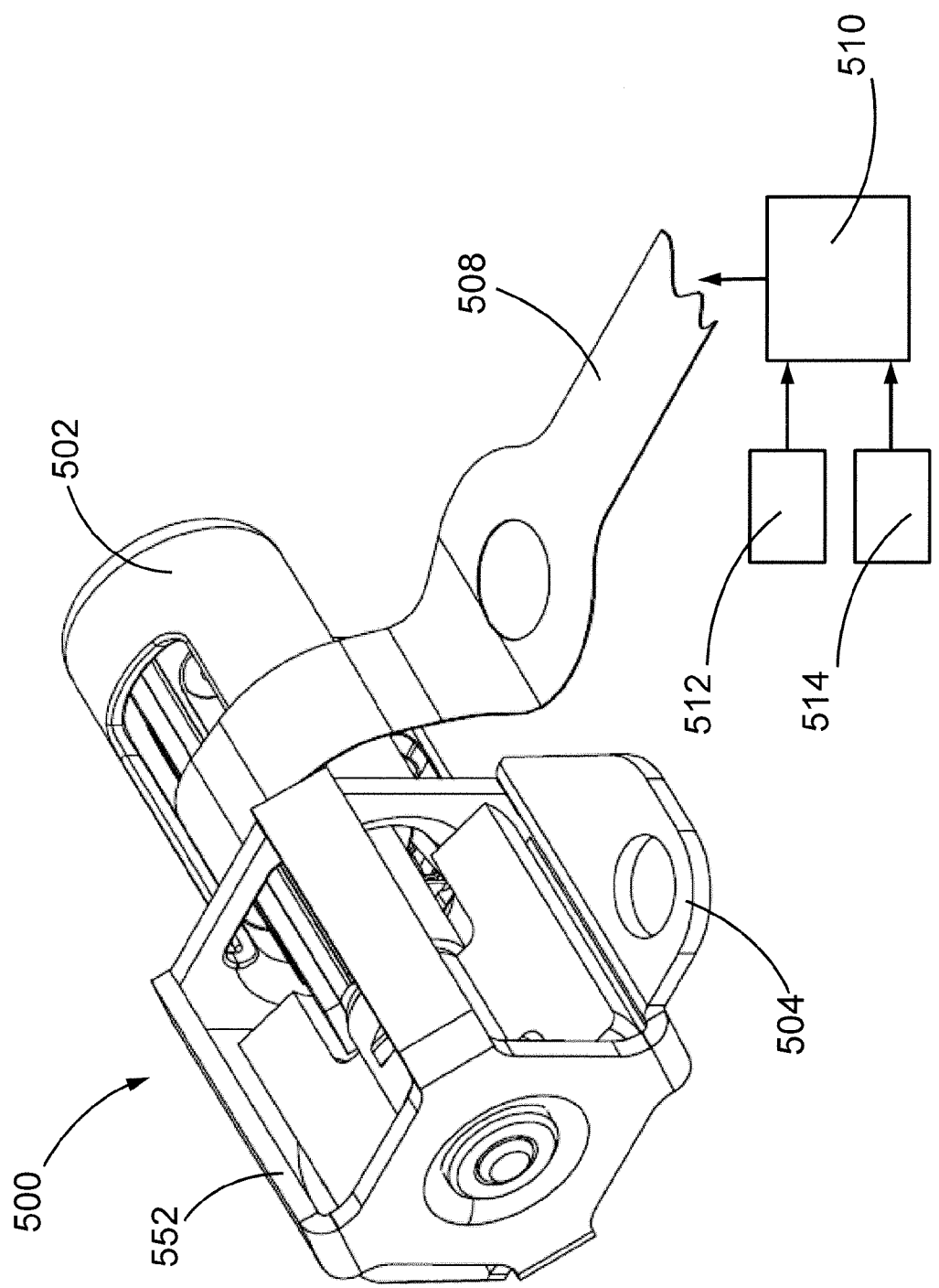
FIG. 5B is a partial isometric view and partial block diagram of the exemplary rotary motor as illustrated in FIG. 5A.

Another embodiment of a rotary motor system 500 of the present invention is illustrated in FIGS. 5A and 5B. Rotary motor system 500 is the same in structure and operation as rotary motor system 100, except as illustrated and described herein. Elements in rotary motor system 500 which are like those in rotary motor system 100 have like reference numerals.

Rotary motor system 500 has a singled unbalanced mass 532 located between the two bearings 536a and 536b, although other numbers of unbalanced masses may be used in other locations. In this example, bearing 536a is pressed into a frame 552 and bearing 536b is pressed into cage or housing 502, which is joined with frame 552 by methods such as welding, although other methods of joining the cage 502 and frame 552 may be used. The center of gravity 538 of the unbalanced mass 532 is located outside the bearing 536a due to length limitations. In this example, bearing 536a is made wider to handle the increased load, although bearing 536a may have other shapes and configurations. Constrained by frame 552 and cage 502 in the motor axis Z, the bearings 536a and 536b cannot fall out in a drop test along the motor axis Z.

Rotary motor system 500 includes three thin washers 540a-c, although other numbers and types of friction reducing elements may be used to increase performance. Washer 540a separates bearing 536a and the unbalanced mass 532 and reduces drag to the rotating mass/shaft during actuator operation. Washer 540b separates the unbalanced mass 532 and the motor tube 516 and reduces friction and the dampening to the tubular motor body 516 during actuator operation. Washer 540c separates the tubular motor body 516 and bearing 536b and it also minimizes the friction and dampening to the tubular motor body 516.

As shown in FIG. 5B, integrated driver IC 510 is connected to power source 512 and interface device 514 and it generates the signals to ultrasonically vibrate the motor body 516. The drive signals are transmitted through the cable 508 to the motor body 516 and cause the shaft 524 and unbalanced mass 532 to rotate, although other electronic elements in different configurations may be used to generate the drive signals to operate the rotary motor system 500.

In this example, when the shaft 524 and the unbalanced mass 532 are driven to the maximum rotation speed, the centripetal force generated by the unbalanced mass 532 (attached to the rotating shaft 524, which is supported by bearings 536a and 536b) is transmitted through bearings 536a and 536b, the cage 502, the mount 504, and finally to the targeted device (not shown), and hence a haptic feeling is generated.

Another embodiment of a rotary motor system 600 of the present invention is illustrated in FIGS. 6A through 6D. Rotary motor system 600 is the same in structure and operation as rotary motor 100, except as illustrated and described herein. Elements in rotary motor system 600 which are like those in rotary motor system 100 have like reference numerals.

Rotary motor system 600 includes two symmetric masses 632a and 632b, which do not include cantilevered or wrapped-around portions, although other numbers of unbalanced masses with different configurations may be used. In this example, the masses 632a and 632b have smaller diameters (compared with that of masses 232a and 232b in haptic actuator 200) and thus can drastically reduce the height profile of the whole haptic actuator or device.

Figure 6A:
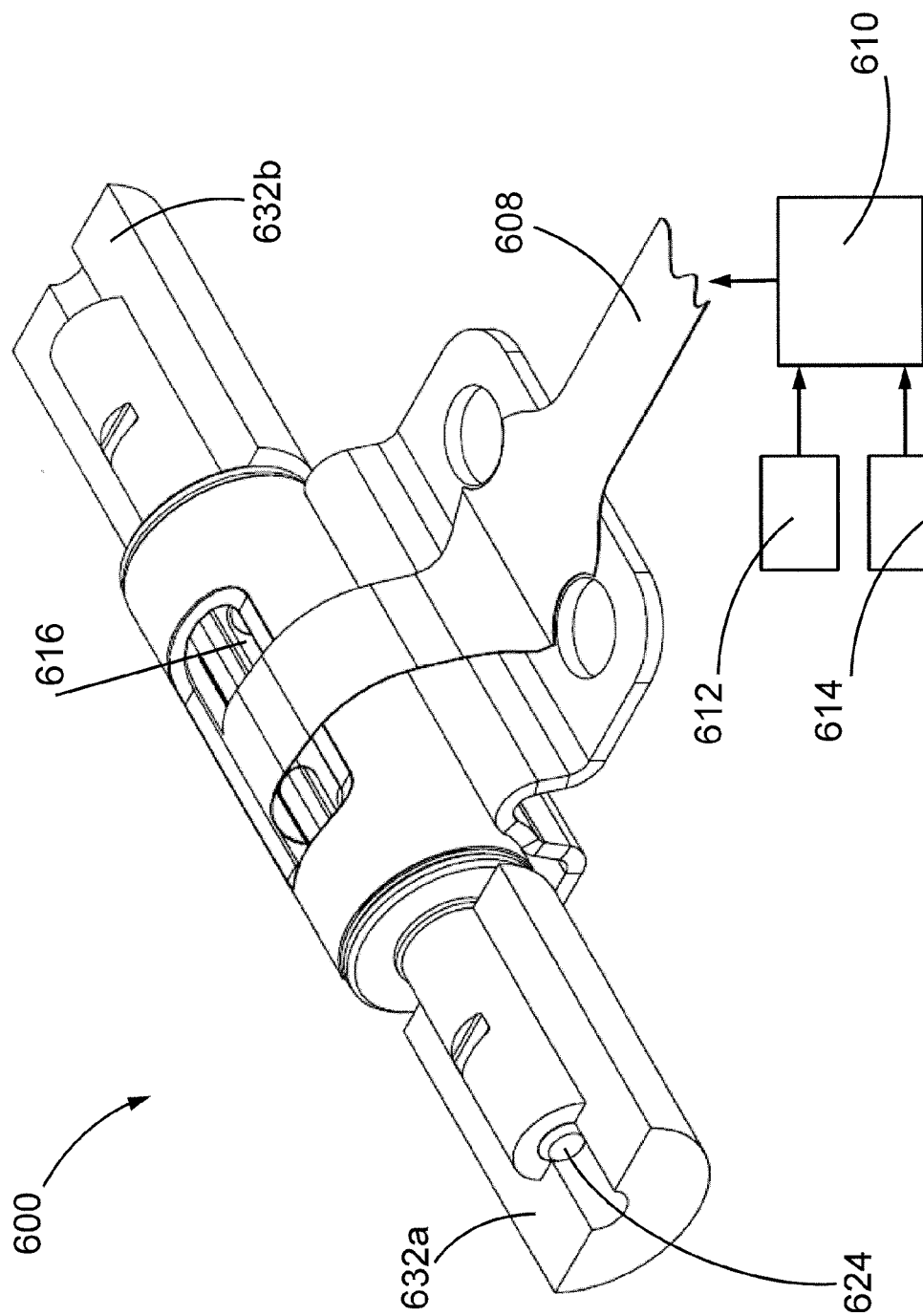
FIG. 6A is a partial isometric view and partial block diagram of still another example of a rotary motor.
Figure 6B:
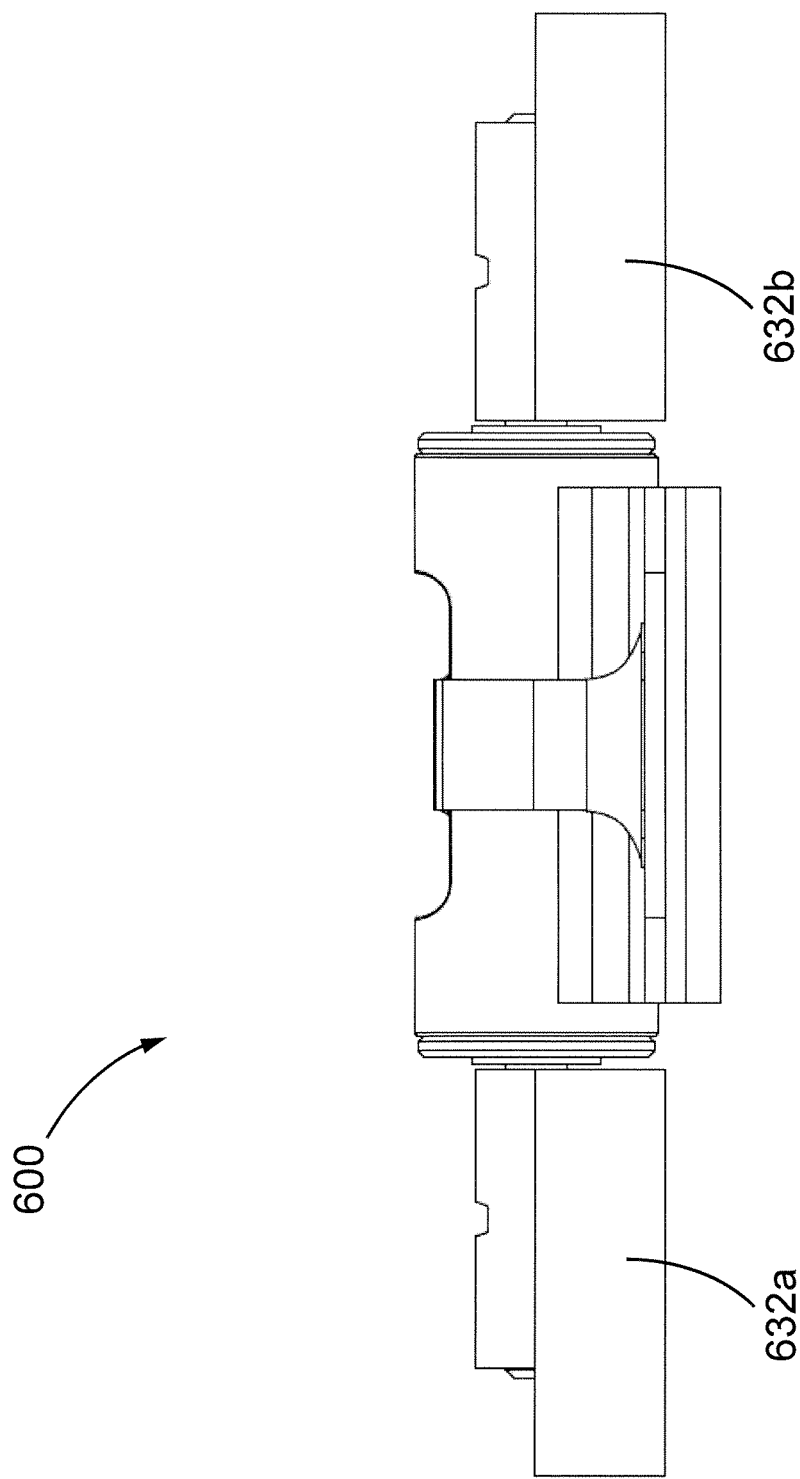
Figure 6C:
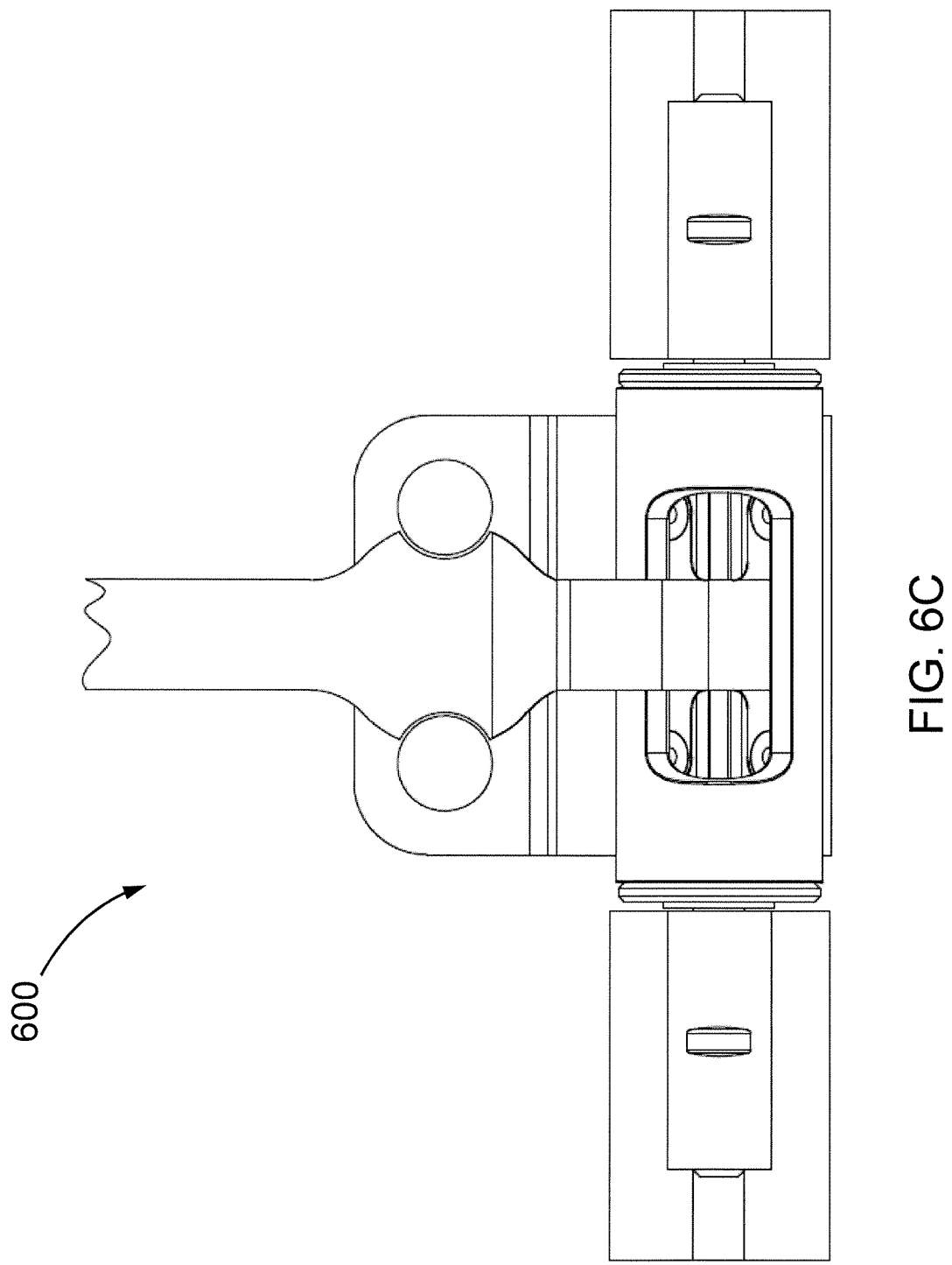

As shown in FIG. 6A, integrated driver IC 610 is connected to power source 612 and interface device 614 and it generates the signals to ultrasonically vibrate the motor body 616. The drive signals are transmitted through the cable 608 to the motor body 616 and cause the shaft 624 and unbalanced masses 632a and 632b to rotate, although other electronic elements in different configurations may be used to generate the drive signals to operate the rotary motor system 600.

Accordingly, as illustrated and described with the examples herein provides more effective and efficient piezoelectric ultrasonic rotary motor apparatuses and methods. With this technology, high rotation speed, larger vibrational force, and longer life for the rotary motor system may be obtained.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A rotary motor comprising:
    a vibrating motor body substantially enclosed within a housing, wherein the vibrating motor body is substantially a tube having two orthogonal first bending modes;
    a shaft frictionally coupled to the vibrating motor body, the shaft arranged to rotate in at least one direction about a rotation axis in response to the vibrating motor body, wherein the shaft is frictionally coupled the vibrating motor body by a force substantially perpendicular to the rotation axis;
    at least one unbalanced mass coupled to and moveable with the shaft to generate human-detectable vibrations in response to a motion of the shaft; and
    one or more bearings supporting the shaft and connected to the housing, wherein the one or more bearings define the axis of rotation of the shaft.

2. The rotary motor of claim 1 wherein the shaft is frictionally coupled at one or more antinodes of the vibrating motor body.

3. The rotary motor of claim 1 wherein the force is applied at one or more node points of the vibrating motor body to generate the friction at the one or more node points against the shaft.

4. The rotary motor of claim 3 wherein a spring coupled to the vibrating motor body at the one or more node points of the vibrating motor body applies the force to the vibrating motor body to generate the friction at the one or more node points against the shaft.

5. The rotary motor of claim 4 further comprising a first and second notch in the vibrating motor body, wherein the first and second notches are located at the node points of the vibrating motor body and the spring comprises a first end portion and a second end portion, wherein the spring is configured with the first end portion in the first notch and the second end portion in the second notch.

6. The rotary motor of claim 1 further comprising at least one spacer located between the at least one unbalanced mass and the vibrating motor body.

7. The rotary motor body of claim 1 further comprising at least one spacer located between the vibrating motor body and the at one or more bearings.

8. The rotary motor of claim 1 wherein the at least one unbalanced mass comprises a single mass fixed to one end of the shaft.

9. The rotary motor of claim 1 wherein the at least one unbalanced mass comprises two masses fixed to opposing ends of the shaft.

10. The rotary motor of claim 1 wherein the at least one unbalanced mass comprises at least one cantilevered section, wherein the cantilevered section is located outside of the housing.

11. The rotary motor of claim 1 wherein the shaft comprises a center portion with a decreased diameter, wherein the shaft is driven by the vibrating motor body at the one or more end portions.

12. The rotary motor of claim 1 wherein a centripetal force generated by the unbalanced mass is transmitted through the bearings to the housing.

13. A method of making a rotary motor comprising:
    providing a vibrating motor body substantially enclosed within a housing, wherein the vibrating motor body is substantially a tube having two orthogonal first bending modes;
    frictionally coupling a shaft to the vibrating motor body by applying a force substantially perpendicular to the rotation axis, wherein the shaft is arranged to rotate in at least one direction about a rotation axis in response to the vibrating motor body;
    providing at least one unbalanced mass coupled to and moveable with the shaft to generate human-detectable vibrations in response to a motion of the shaft; and
    providing one or more bearings supporting the shaft and connected to the housing, wherein the one or more bearings define the axis of rotation of the shaft.

14. The method of claim 13 wherein the shaft is frictionally coupled at one or more antinodes of the vibrating motor body.

15. The method of claim 13 wherein the force is applied at one or more node points of the vibrating motor body to generate the friction at the one or more node points against the shaft.

16. The method of claim 13 further wherein the frictionally coupling further comprises providing a spring coupled to the vibrating motor body at the one or more node points of the vibrating motor body to apply the force to the vibrating motor body to generate the friction at the one or more node points against the shaft.

17. The method of claim 16 further comprising providing a first and second notch in the vibrating motor body, wherein the first and second notches are located at node points of the vibrating motor body and the spring comprises a first end portion and a second end portion, wherein the spring is configured with the first end portion in the first notch and the second end portion in the second notch.

18. The method of claim 13 further comprising providing at least one spacer located between the at least one unbalanced mass and the vibrating motor body.

19. The method of claim 13 further comprising at least one spacer located between the vibrating motor body and the at least one bearings.

20. The method of claim 13 wherein the at least one unbalanced mass comprises a single mass fixed to one end of the shaft.

21. The rotary motor of claim 13 wherein the at least one unbalanced mass comprises two masses fixed to opposing ends of the shaft.

22. The method of claim 13 wherein the at least one unbalanced mass comprises at least one cantilevered section, wherein the cantilevered section is located outside of the housing.

23. The method of claim 13 wherein the shaft comprises a center portion with a decreased diameter, wherein the shaft is driven by the vibrating motor body at the one or more end portions.

24. The method of claim 13 wherein a centripetal force generated by the unbalanced mass is transmitted through the bearings to the housing.

* * * * *